United States Patent [19]
Saito et al.

[11] Patent Number: 5,694,139
[45] Date of Patent: Dec. 2, 1997

[54] SHORT-DISTANCE COMMUNICATION ANTENNA AND METHODS OF MANUFACTURING AND USING THE SHORT-DISTANCE COMMUNICATION ANTENNA

[75] Inventors: Shoshichi Saito; Masahiro Fujimoto; Katsuhisa Orihara; Susumu Yanagibori, all of Tochigi, Japan

[73] Assignee: Sony Corporation, Tokyo, Japan

[21] Appl. No.: 493,818

[22] Filed: Jun. 22, 1995

[30] Foreign Application Priority Data

| Jun. 28, 1994 | [JP] | Japan | 6-146467 |
| May 29, 1995 | [JP] | Japan | 7-130799 |
| May 29, 1995 | [JP] | Japan | 7-130800 |

[51] Int. Cl.⁶ ............................................. H01Q 11/12
[52] U.S. Cl. ...................... 343/866; 343/788; 343/741; 343/742
[58] Field of Search .................... 343/788, 787, 343/741, 742, 866, 867; 235/492, 382, 384; H01Q 11/12

[56] References Cited

U.S. PATENT DOCUMENTS

| 2,961,658 | 11/1960 | Spencer et al. | 343/787 |
| 3,069,680 | 12/1962 | Seeley et al. | 343/787 |
| 3,965,474 | 6/1976 | Guerrino et al. | 343/788 |
| 4,243,980 | 1/1981 | Lichtblau | 343/742 |
| 5,159,347 | 10/1992 | Osterwalder | 343/787 |
| 5,341,148 | 8/1994 | Walter et al. | 343/742 |
| 5,495,259 | 2/1996 | Lyasko | 343/787 |
| 5,583,330 | 12/1996 | Fallah et al. | 235/492 |

FOREIGN PATENT DOCUMENTS

| 58-134505 | 8/1983 | Japan | 343/742 |

*Primary Examiner*—Hoanganh T. Le
*Attorney, Agent, or Firm*—Jay H. Maioli

[57] ABSTRACT

A short-distance communication antenna can satisfactorily transmit and receive an information signal within a regulation range of the radio law. Also, the short-distance communication antenna provided on a card reader/writer enables the card reader/writer to communicate with a non-contacting information card without being limited by the direction of the non-contacting information card upon reception. This short-distance communication antenna includes a plurality of magnetic poles disposed on a magnetic member and to and from which a magnetic flux is transmitted and received, and a coil for transmitting or transmitting and receiving the information signal mounted on at least one of the magnetic poles. Further, the short-distance communication antenna includes a housing having an aperture to and from which a magnetic flux is transmitted and received, and a coil for transmitting or transmitting and receiving the information signal mounted on said housing. Furthermore, there are also provided methods of manufacturing and of using the above short-distance communication antenna. In this case, the most specific feature of this invention is that a magnetic flux of the communication antenna is closed and a communication area is limited.

1 Claim, 30 Drawing Sheets

F I G. 10
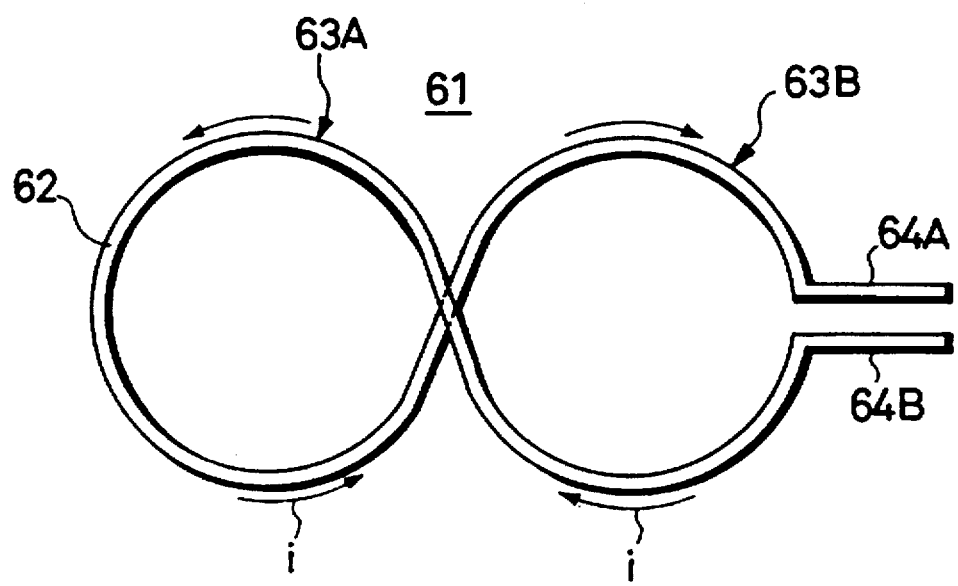
F I G. 11
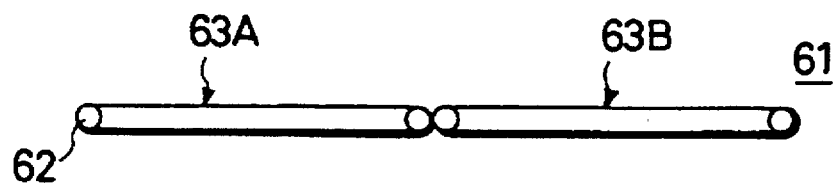

F I G. 17
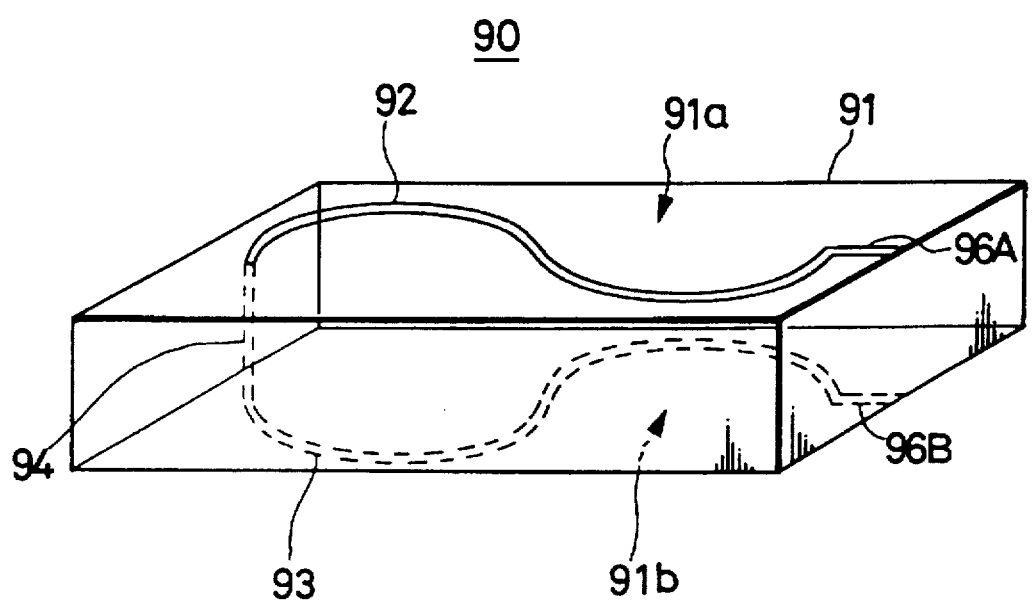

FIG. 24

| Definition of Wiring Head Position | Order of Operation | (A) Left and Right Movement | (B) Rotational Displacement |
|---|---|---|---|
| | ① | g | g |
| | ② | b | b |
| | ③ | c | c |
| | ④ | f | f |
| | ⑤ | e | e |
| | ⑥ | d | d |
| | ⑦ | c | c |
| | ⑧ | f | f |
| | ⑨ | g | g |
| | ⑩ | b | b |
| | ⑪ | a | a |
| | ⑫ | h | h |

Head position layout: a b c d e f g h with heads 82, 83, 84

SHORT-DISTANCE COMMUNICATION ANTENNA AND METHODS OF MANUFACTURING AND USING THE SHORT-DISTANCE COMMUNICATION ANTENNA

BACKGROUND OF THE INVENTION

The present invention relates to a communication antenna for a card reader/writer and methods of manufacturing and using the communication antenna. More particularly, this invention relates to a communication antenna for a card reader/writer for transmitting an information signal to or transmitting and receiving an information signal to or from a non-contacting information card by using an induced electromagnetic field generated by electromagnetic induction as a transmission medium and methods of manufacturing and using the communication antenna.

IC (integrated circuit) card systems, such as an automatic ticket examination system and an automatic entrance management system, have heretofore used a non-contacting information card, such as a management card, and a card reader/writer to transmit information, such as an identification (ID) number, an entrance date and a due date, between the non-contacting information card and the card reader/writer by electromagnetic induction.

FIG. 1 of the accompanying drawings shows in schematic block form an example of an information card system, such as an automatic ticket examination system, an entrance management system and an IC (integrated circuit) card system. The information card system will be described below with reference to FIG. 1.

As shown in FIG. 1, the information card system is composed of a card reader/writer 1 and a non-contacting information card 2 which utilizes electromagnetic induction to transmit and receive an information signal between it and the card reader/writer 1.

As shown in FIG. 1, the card reader/writer 1 includes a main control unit 10 formed of a CPU (central processing unit) and a high-order interface controller 11. A digital signal of transmission information from the main control unit 10 is processed by a P/S (parallel-to-serial) converter 12 in a digital modulation fashion, such as an ASK (amplitude shift keying) modulation or FSK (frequency shift keying) modulation. A modulated digital signal output from the P/S converter 12 is supplied to a digital modulator/amplifier 13. A digital modulated signal obtained at the output side of the digital modulator/amplifier 13 is supplied to a transmission antenna 14. A carrier oscillator 15 is connected to the digital modulator/amplifier 13 and generates a carrier signal having a frequency of several 100s of kilohertz.

The card reader/writer 1 includes a reception antenna 16. A digital modulated signal received at the reception antenna 16 is supplied to an amplifier/demodulator 17, in which it is amplified and demodulated. The demodulated digital signal obtained at the output side of the amplifier/demodulator 17 is converted to the form of parallel data by a S/P (serial-to-parallel) converter 18 and supplied to the main control unit 10.

The non-contacting information card 2 includes a reception antenna 20 which receives the digital modulated signal from the transmission antenna 14 of the card reader/writer 1 in an electromagnetic induction fashion. FIG. 2 shows an example of transmitting and receiving the carrier signal having the frequency of several 100s of kilohertz by electromagnetic induction.

As shown in FIG. 2, the transmission antenna 14 might be formed of a loop antenna and a reception antenna 20 might be an antenna having a core. A communication is made between the loop antenna 14 and the reception antenna 20 by a signal induced at the reception antenna (antenna having a core) 20 due to the change of a magnetic field generated near the loop antenna 14 by the RF current of several 100s of kilohertz supplied to the loop antenna 14.

Referring back to FIG. 1, the digital modulated signal obtained at the reception antenna 20 is amplified and demodulated by an amplifier/demodulator 21, such as an ASK or FSK demodulator. The digital signal obtained at the output side of the amplifier/demodulator 21 is converted to the form of parallel data by a S/P (serial-to-parallel) converter 22 and then supplied to a main control unit 23 formed of a CPU.

It is determined by the main control unit 23 whether or not information based on the digital signal is a read command signal, a write command signal or write information. Then, the main control unit 23 supplies a predetermined signal to a data memory 24 on the basis of the identified result. Then, information is written in and read out from the data memory 24 under the control of the main control unit 23.

The digital signal which is read out from the data memory 24 is supplied to the main control unit 23. Then, the digital signal which is read out from the main control unit 23 is converted to the form of serial data by a P/S (parallel-to-serial) converter 25 and modulated in a digital fashion, such as an ASK modulation, and then amplified by a digital modulator/amplifier 26. A digital modulated signal obtained at the output side of the digital modulator/amplifier 26 is transmitted to the reception antenna 16 of the card reader/writer 1 through the transmission antenna 27 in an electromagnetic induction fashion. An oscillator 28 is connected to the digital modulator/amplifier 26 and generates a carrier signal having a frequency of several 100s of kilohertz. In FIG. 1, a dotted line block 29 is a battery which supplies an operational voltage to this non-contacting information card.

Since the information card system is arranged as described above, when information is written in the non-contacting information card, initially, the write command signal and the write information signal are supplied to the digital modulator/amplifier 13 from the main control unit 10 of the card reader/writer 1 through the P/S converter 12, digitally modulated and then supplied to the transmission antenna 14.

The same signal as the signal supplied to the transmission antenna 14 is induced at the reception antenna 20 of the non-contacting information card 2 due to electromagnetic induction. The signal thus induced is demodulated to the digital signal of the information signal by the amplifier/demodulator 21 of the non-contacting information card 2. Then, the digital signal thus demodulated is converted to the form of parallel data by the S/P converter 22 and supplied to the main control unit 23.

The main control unit 23 identifies the write command signal and the write information signal of the digital signal thus transmitted and writes and stores the write information signal in the data memory 24.

When designated information is read out from the data memory 24 of the non-contacting information card 2, similar in respect to the case when designated information is written in the data memory 24, a digital read command signal is transmitted from the card reader/writer 1 to the non-contacting information card 2 as a digital modulated signal.

The main control unit 23 of the non-contacting information card 2 detects the read command signal transmitted thereto from the card reader/writer 1. Designated information is read out from the data memory 24 from its area designated by the read command signal. The digital signal thus read out is converted to a serial signal by the P/S converter 25 and digitally modulated by the digital modulator/amplifier 26 which derives a digital modulated signal of this information signal. This digital modulated signal is transmitted to the reception antenna 16 of the card reader/writer 1 through the transmission antenna 27 in an electromagnetic induction fashion.

The digital modulated signal transmitted to the reception antenna 16 is demodulated to the digital signal of the information signal by the amplifier/demodulator 17. Then, the digital signal of the information signal is converted to the parallel signal by the S/P converter 18. Thus, the information signal of the original digital signal is supplied to the main control unit 10.

The above information card system uses the loop antennas as the transmission antennas 14, 27 to transmit and receive the information signal between the card reader/writer 1 and the non-contacting information card 2 by electromagnetic induction.

The loop antennas serving as the transmission antennas 14, 27 are sufficiently small as compared with the wavelength. Therefore, since the communication area of the loop antenna 14 (27) is sufficiently small as compared with the wavelength, the electromagnetic field could be approximated by electro-/magnetostatic ones. Thus, this loop antenna 14, for example, presents a magnetic field distribution shown in FIG. 3. In FIG. 3, reference numeral 14a denotes a magnetic line of force.

As a result, this communication region becomes symmetrical with respect to front and back, right and left, and up and down. In this case, if the intensity of the radiation magnetic field is restricted to a radiated electromagnetic field intensity (500 µV/m at the position distant from the communication region by 3 m) obtained within the regulatory range of the radio law, then a communication distance is limited and a communication quality becomes difficult to be maintain.

Moreover, since the loop antenna is weak in directivity, the loop antenna tends to be easily affected by a metal material existing near the loop antenna.

FIG. 4 shows another example of the transmission antennas 14, 27. As shown in FIG. 4, an antenna wire 31 is wound around a groove portion of a pot core 30 made of a ferromagnetic material. In this case, a magnetic line of force extends from a center convexed core 30a to an outer peripheral annular core 30b as shown by solid lines in FIG. 4. At that time, however, as shown by dotted lines in FIG. 4, leakage magnetic fluxes are generated in all directions and the loop antenna tends to be easily affected by the metal material existing around the loop antenna.

As shown in FIG. 5, when the antenna shown in FIG. 4 is utilized as the transmission antenna 14 of the card reader/writer 1 (e.g., information card system is used as the automatic ticketing system), the non-contacting information card 2 can be scanned from any direction. However, since the leakage magnetic flux is generated in all directions, a magnetic flux density received by the non-contacting information card 2 is reduced. In this case, the pot core 30, which is the magnetic core, has to be miniaturized in order to increase the magnetic flux density. There is then the size of the disadvantage that the communication region is reduced.

SUMMARY OF THE INVENTION

In view of the aforesaid aspect, it is an object of the present invention to provide a communication antenna which is not limited by the inclination angle at which a non-contacting information card is placed in the magnetic flux, and which can efficiently transmit electric power, and methods of manufacturing and using the communication antenna.

It is another object of the present invention to provide a communication antenna having a directivity in order to limit a communication area and methods of manufacturing and using the communication antenna.

It is a further object of the present invention to provide a communication antenna in which a communication area for a non-contacting information card and a card reader/writer antenna can be secured sufficiently and methods of manufacturing and using the communication antenna.

It is yet a further object of the present invention to provide a communication antenna in which an electric power can be transmitted efficiently regardless of the positional direction of a non-contacting information card upon reception and methods of manufacturing and using the communication antenna.

According to a first aspect of the present invention, there is provided a communication antenna provided on a card reader/writer to transmit, or, transmit, and receive, an information signal from the card reader/writer to and from a non-contacting information card by electromagnetic induction. This communication antenna comprises a plurality of magnetic poles disposed on a magnetic member and to and from which a magnetic flux is transmitted and received, and a coil for transmitting or transmitting and receiving the information signal mounted on at least one of the magnetic poles.

According to a second aspect of the present invention, there is provided a communication antenna provided on a card reader/writer to transmit, or transmit and receive, an information signal from the card reader/writer to, or to and from, a non-contacting information card by electromagnetic induction. This communication antenna comprises a housing having an aperture to and from which a magnetic flux is transmitted and received, and a coil for transmitting or transmitting, and receiving, the information signal mounted on the housing.

According to a third aspect of the present invention, there is provided a communication antenna provided on a card reader/writer to transmit, or transmit, and receive, an information signal from the card reader/writer to, or to and from, a non-contacting information card by electromagnetic induction. This communication antenna comprises a housing having an aperture to and from which a magnetic flux is transmitted and received, and a coil formed by winding a conductor around a magnetic member inserted into the inside of the housing.

According to a fourth aspect of the present invention, there is provided a communication antenna provided on a card reader/writer to transmit, or transmit and receive, an information signal from the card reader/writer to, or to and from, a non-contacting information card by electromagnetic induction. This communication antenna comprises a loop antenna constructing the communication antenna wherein the loop antenna is formed by turning up an antenna conductor in a loop fashion so that currents of opposite directions flow to adjacent loop coils.

According to a fifth aspect of the present invention, there is provided a method of manufacturing a communication antenna which comprises the step of winding an antenna conductor around a plurality of bobbins fixed at a predetermined interval while the antenna conductor is alternately reciprocated between the bobbins.

According to a sixth aspect of the present invention, there is provided a communication antenna provided on a card reader/writer to transmit, or transmit and receive, an information signal from the card reader/writer to and from a non-contacting information card by electromagnetic induction. This communication antenna comprises an antenna conductor, where the conductor pattern has a substrate insulating material on which the antenna conductor and an adjustment strip are formed, and wherein the conductor patterns formed on both surfaces of the insulating base are connected through a through-hole such that the currents in the adjacent loop antennas flow in opposite directions.

In accordance with a seventh aspect of the present invention, there is provided a method of using a communication antenna, wherein the communication antenna is in use, the loop antenna is disposed such that a magnetic flux direction of the antenna is extended along the direction in which the non-contacting information card is moved.

The above and other objects, features, and advantages of the present invention will become apparent from the following detailed description of the following embodiments read in conjunction with the accompanying drawings, in which like reference numerals are used to identify the same or similar parts in the several views.

BRIEF DESCRIPTION OF THE DRAWINGS

FIG. 10 is a plan view showing a short-distance communication antenna according to a second embodiment of the present invention;

FIG. 11 is a cross-sectional view of the short-distance communication antenna shown in FIG. 10;

Figure 13:
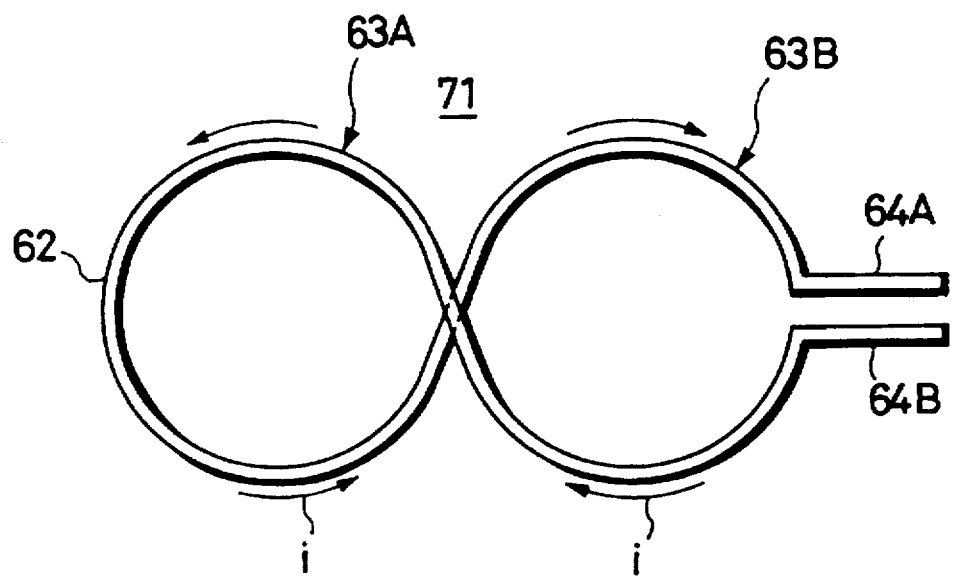
Figure 14:
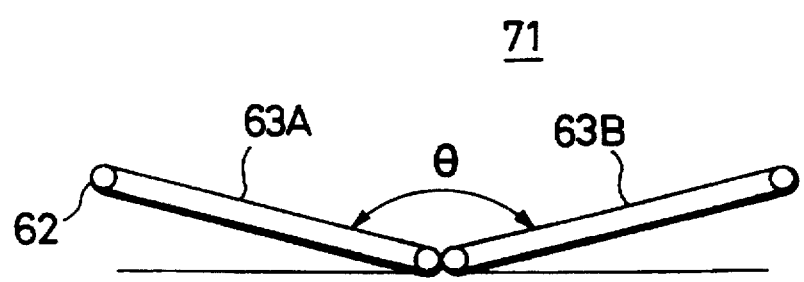
Figure 15:
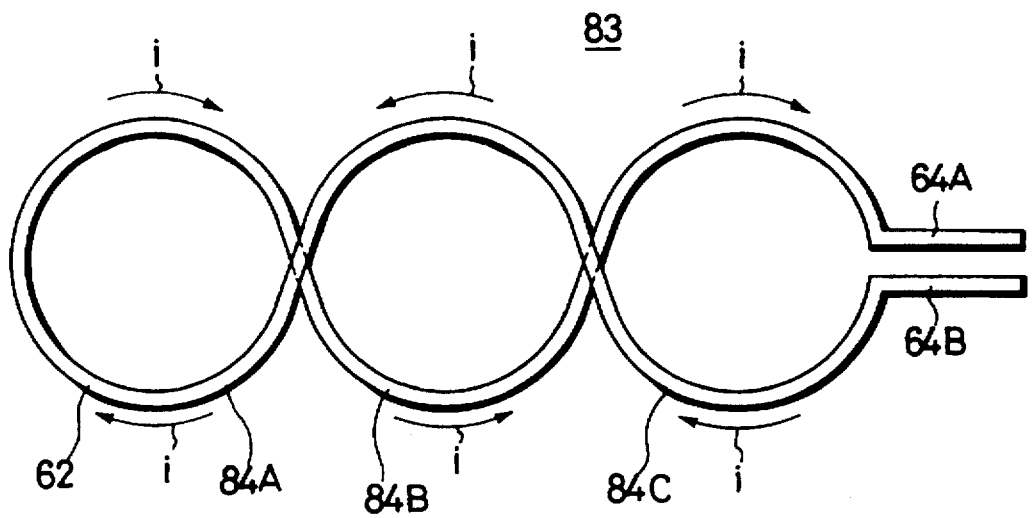
Figure 16:
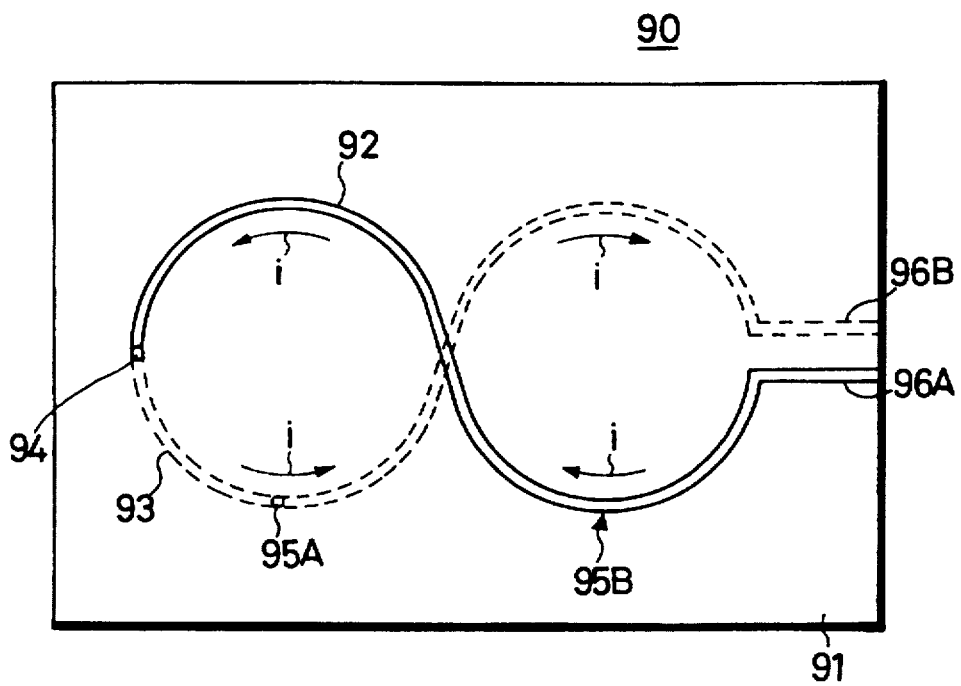
Figure 18:
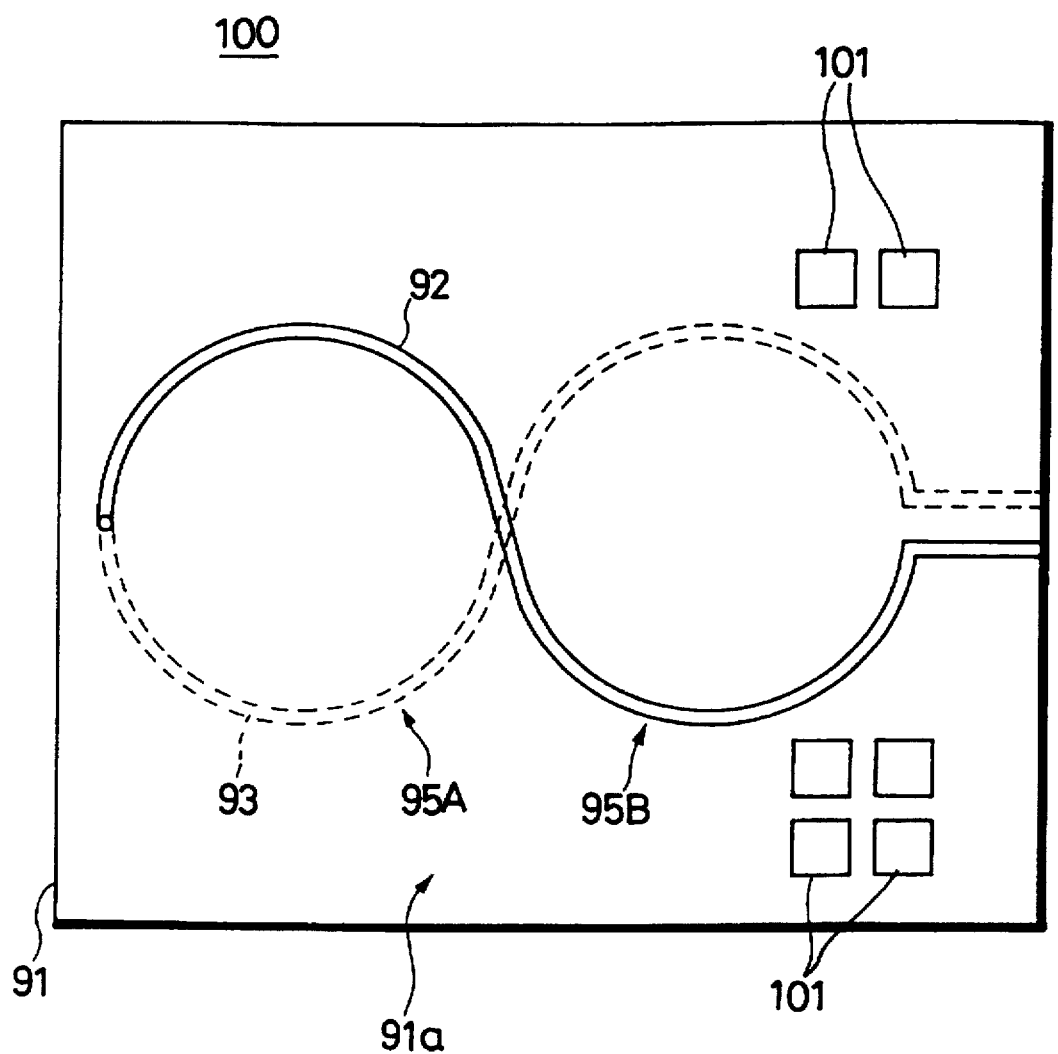
Figure 19A:
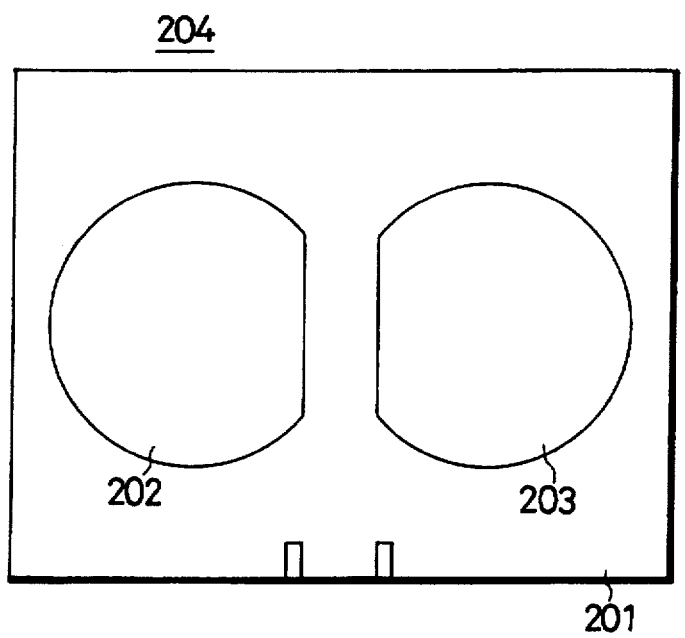
Figure 19C:
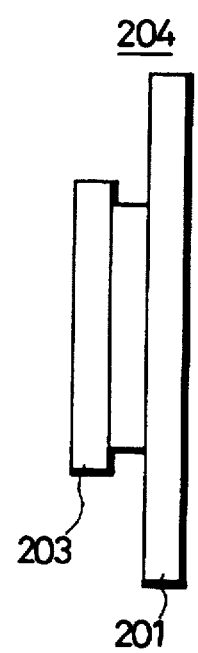
Figure 19B:
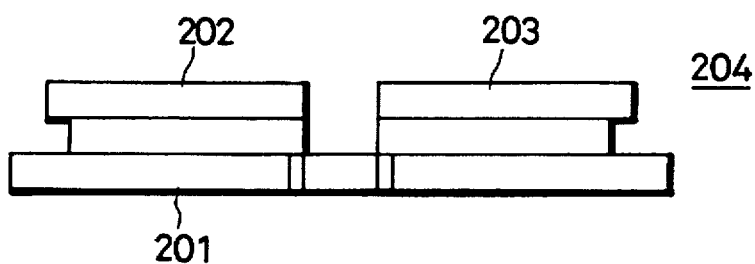
Figure 20:
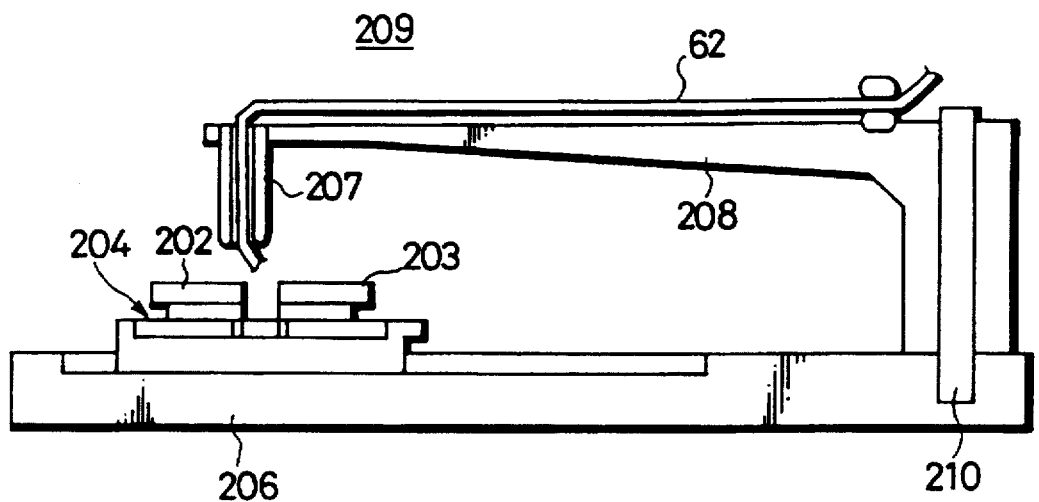
Figure 21:
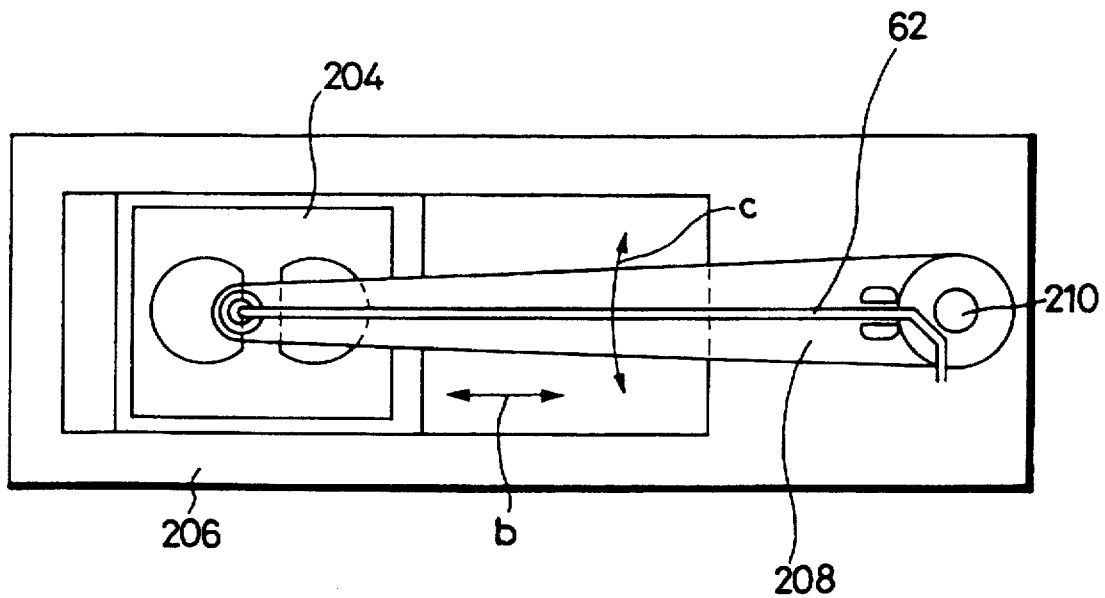
Figure 22:
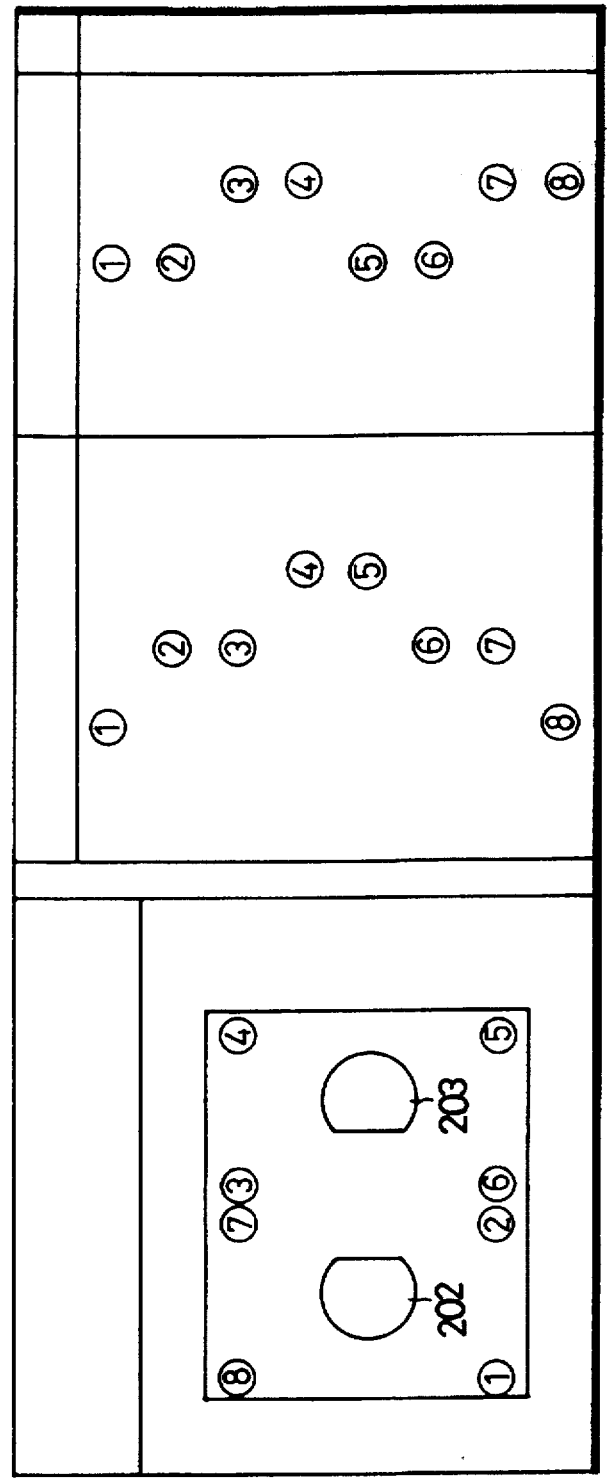
Figure 23C:
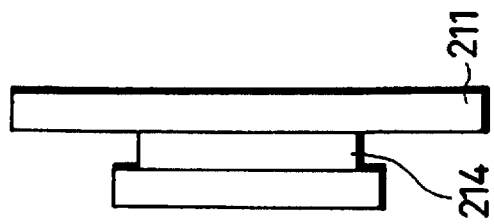
Figure 23A:
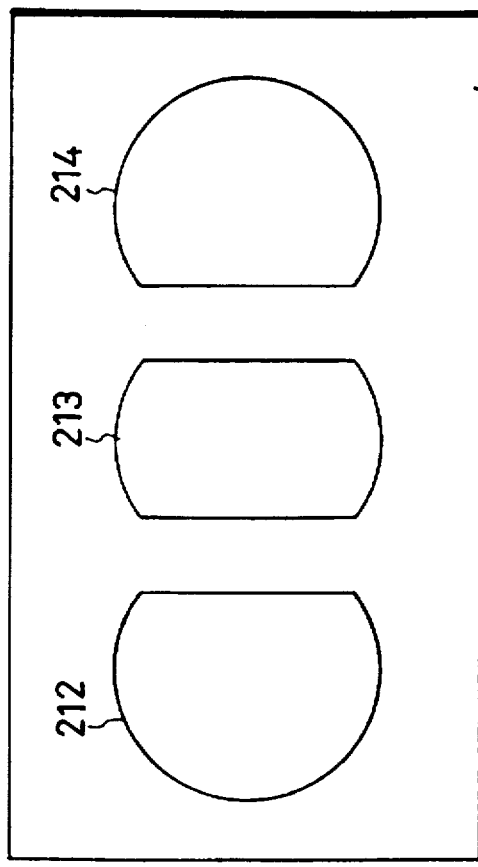
Figure 23B:
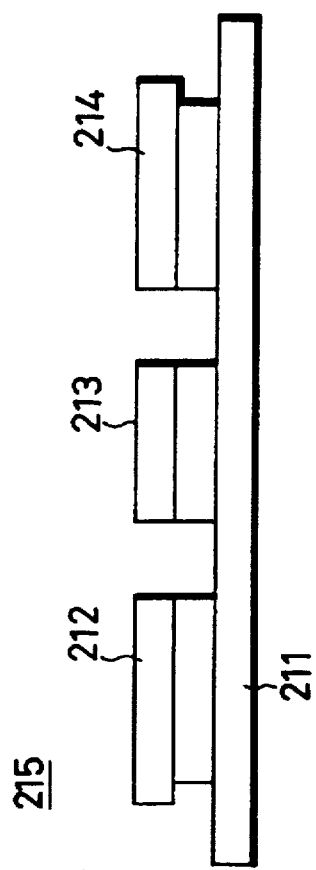
Figure 25:
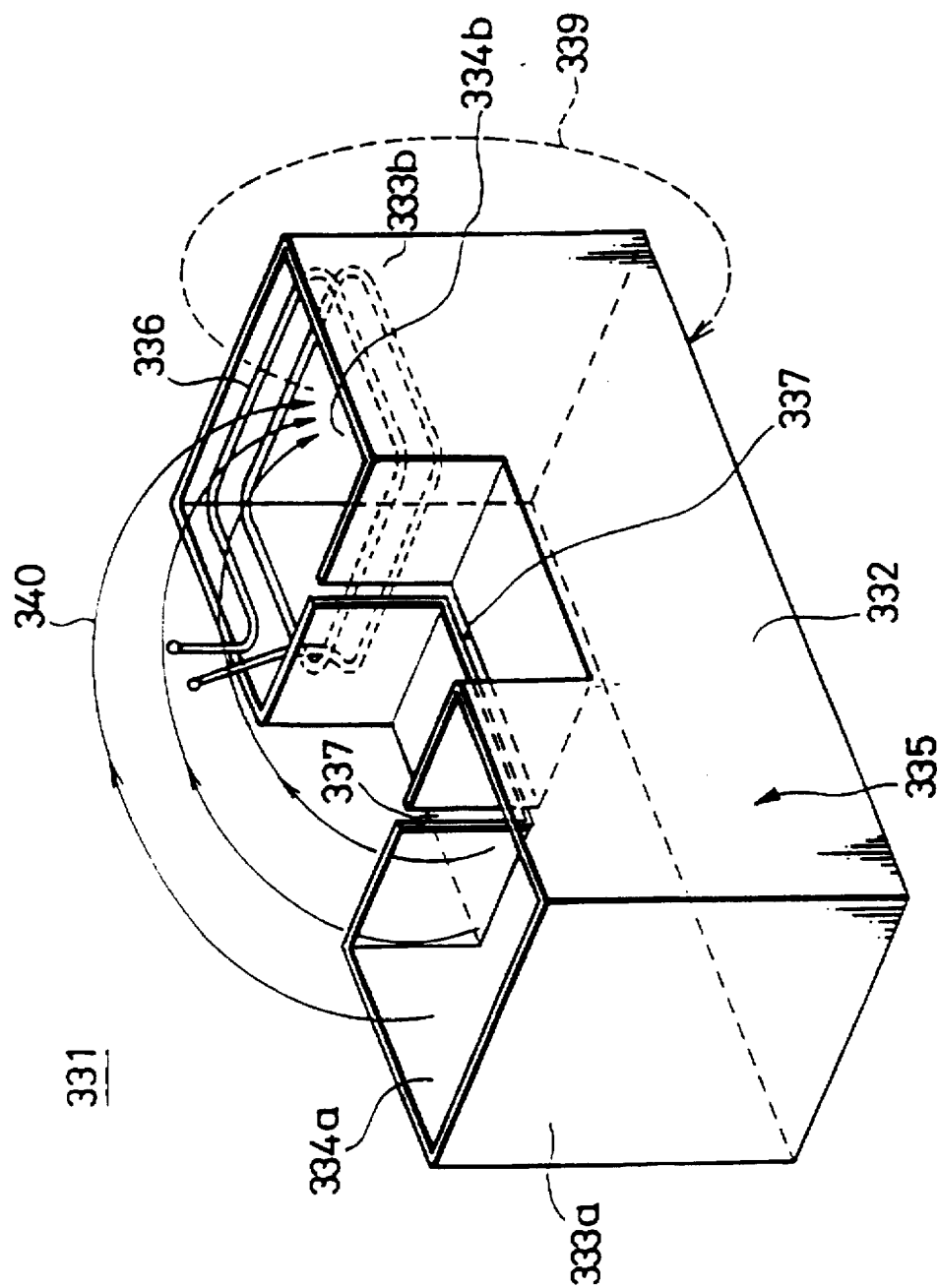
Figure 26:
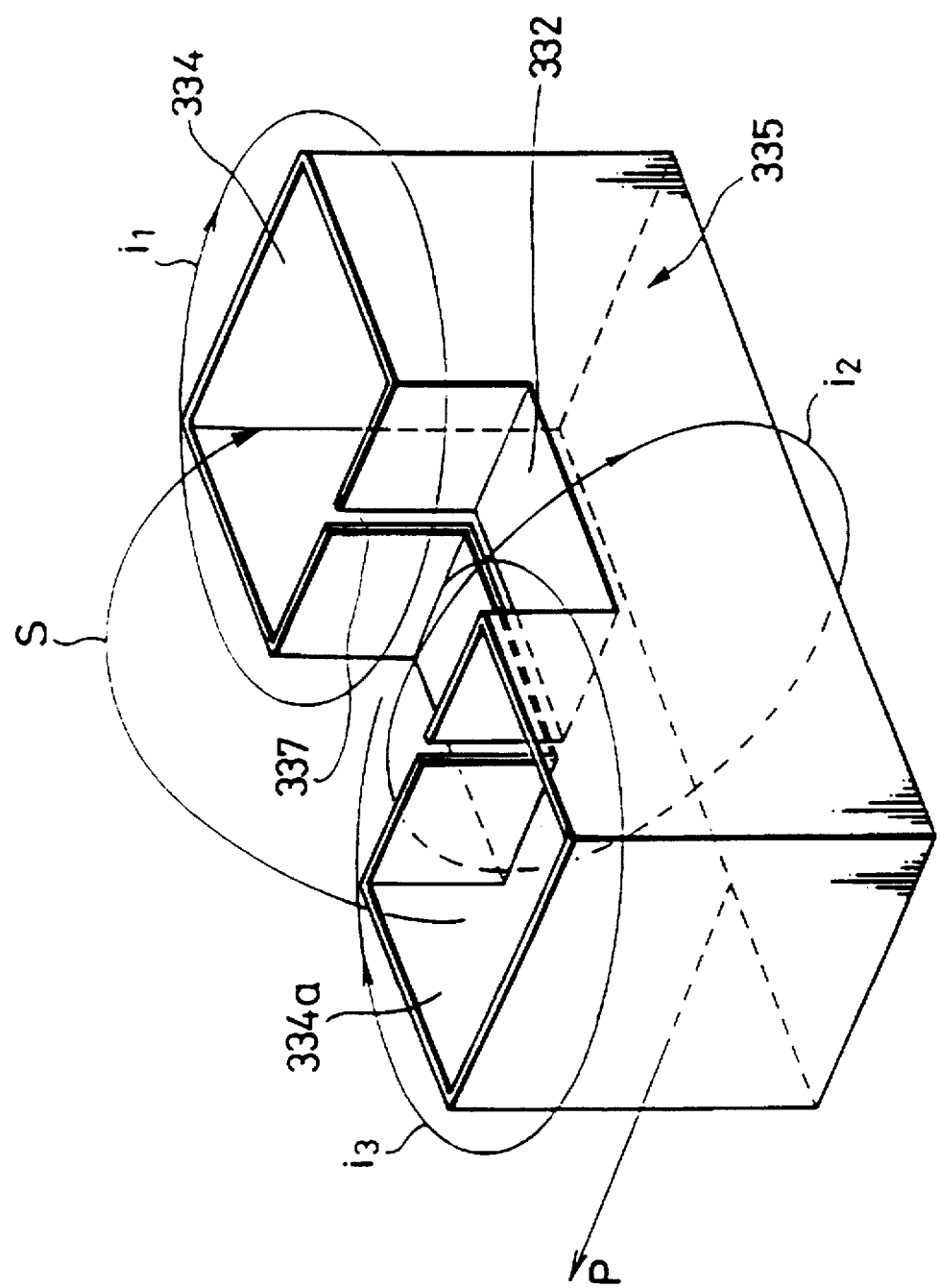
Figure 27:
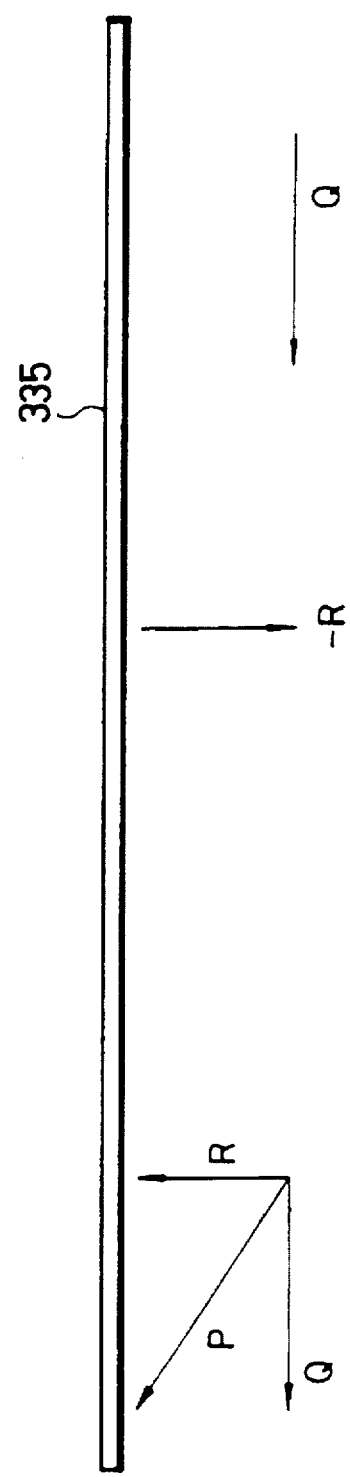
Figure 28:
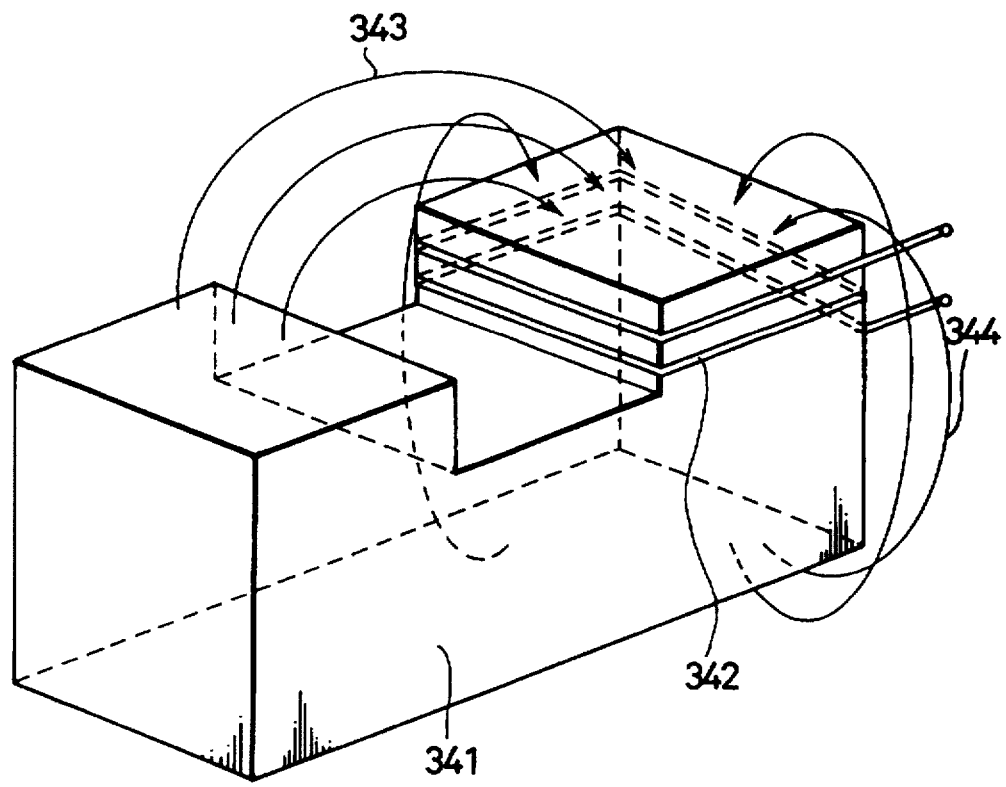
Figure 29:
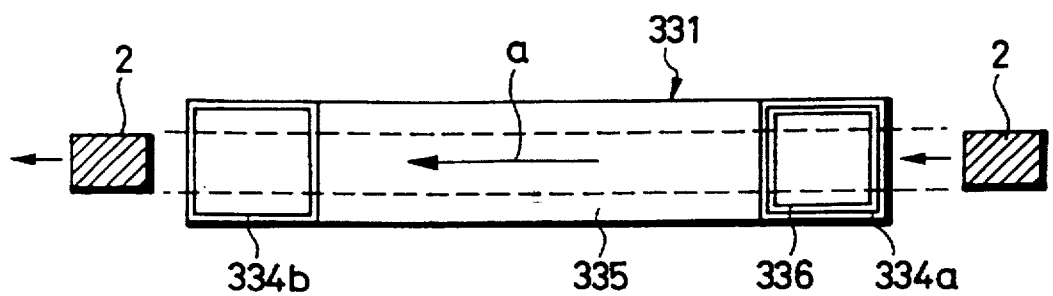
Figure 30:
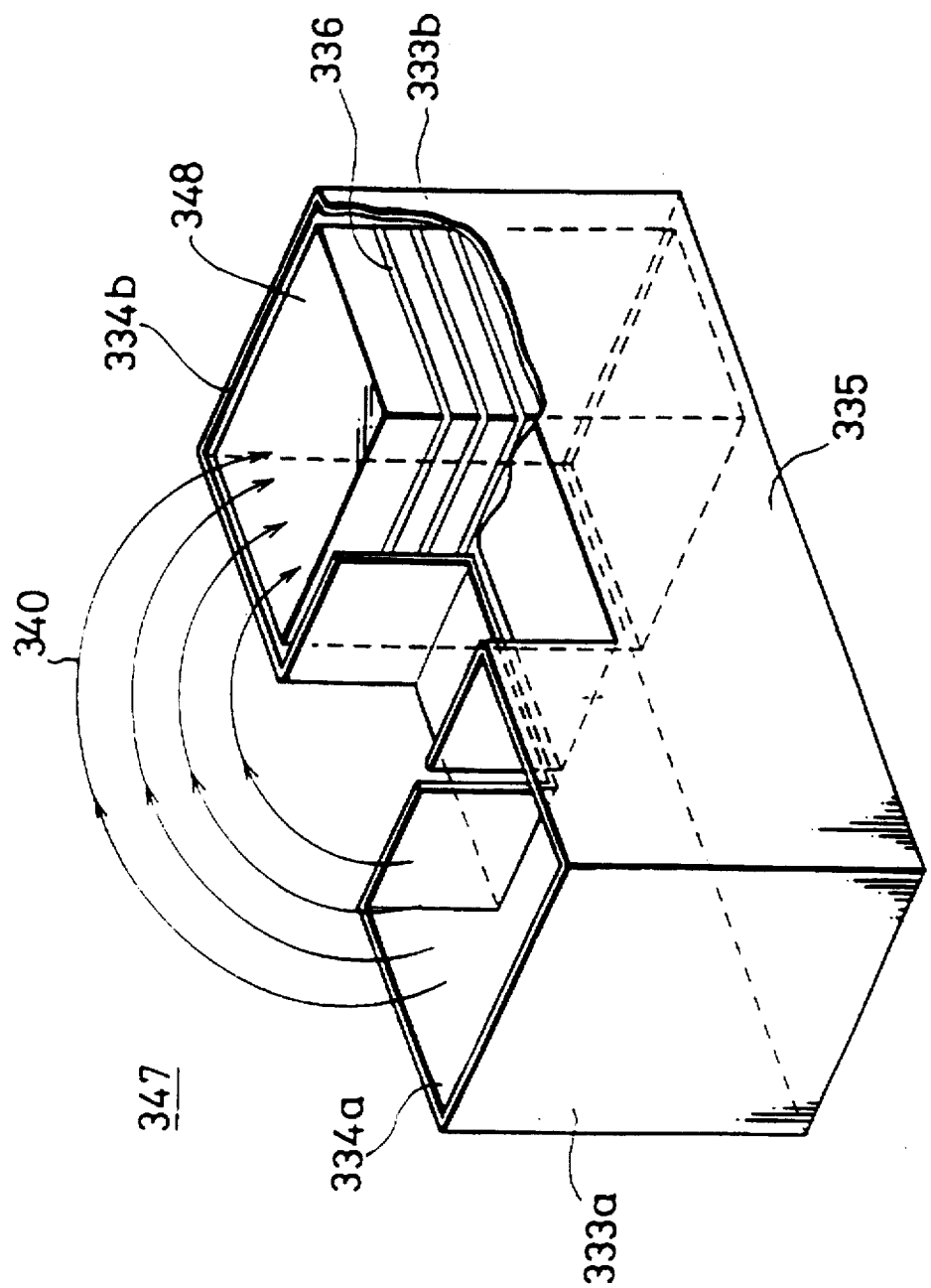
Figure 31:
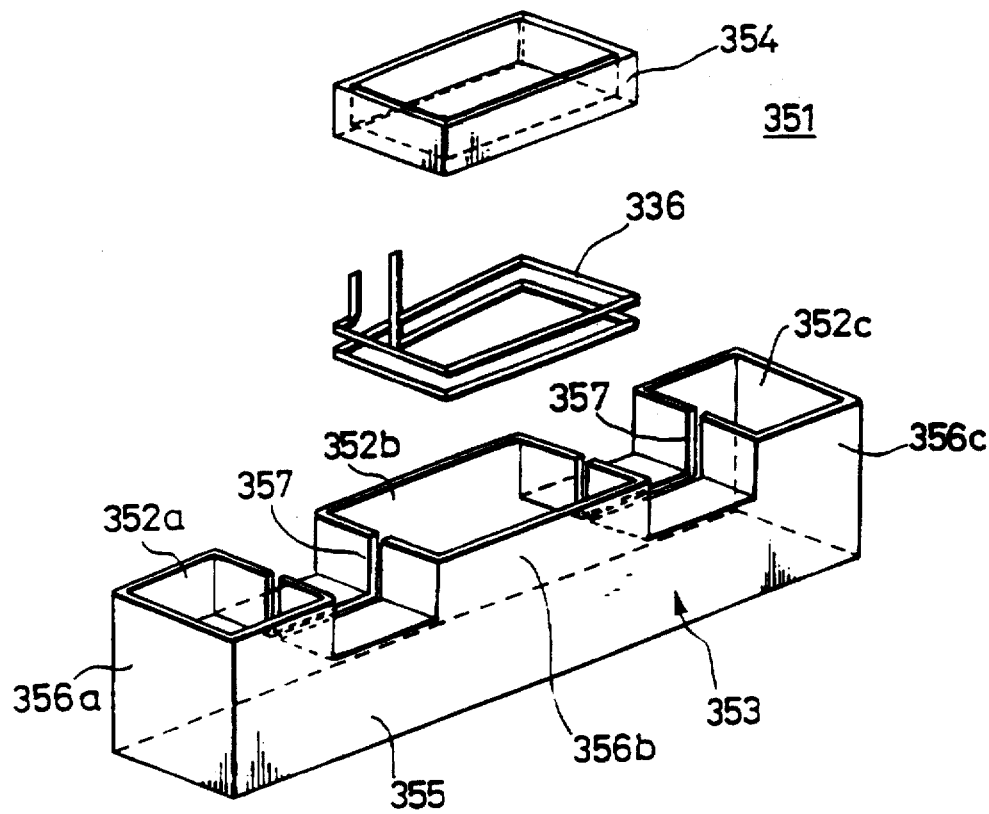
Figure 32:
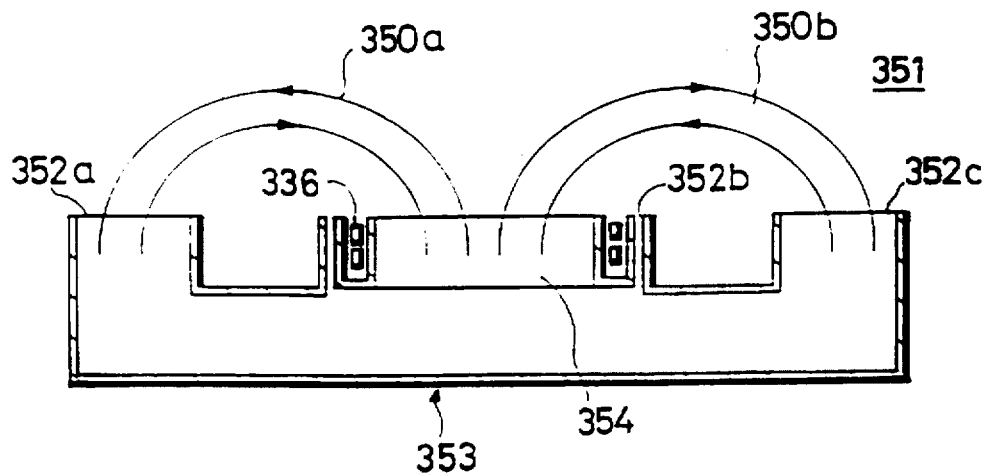
Figure 33:
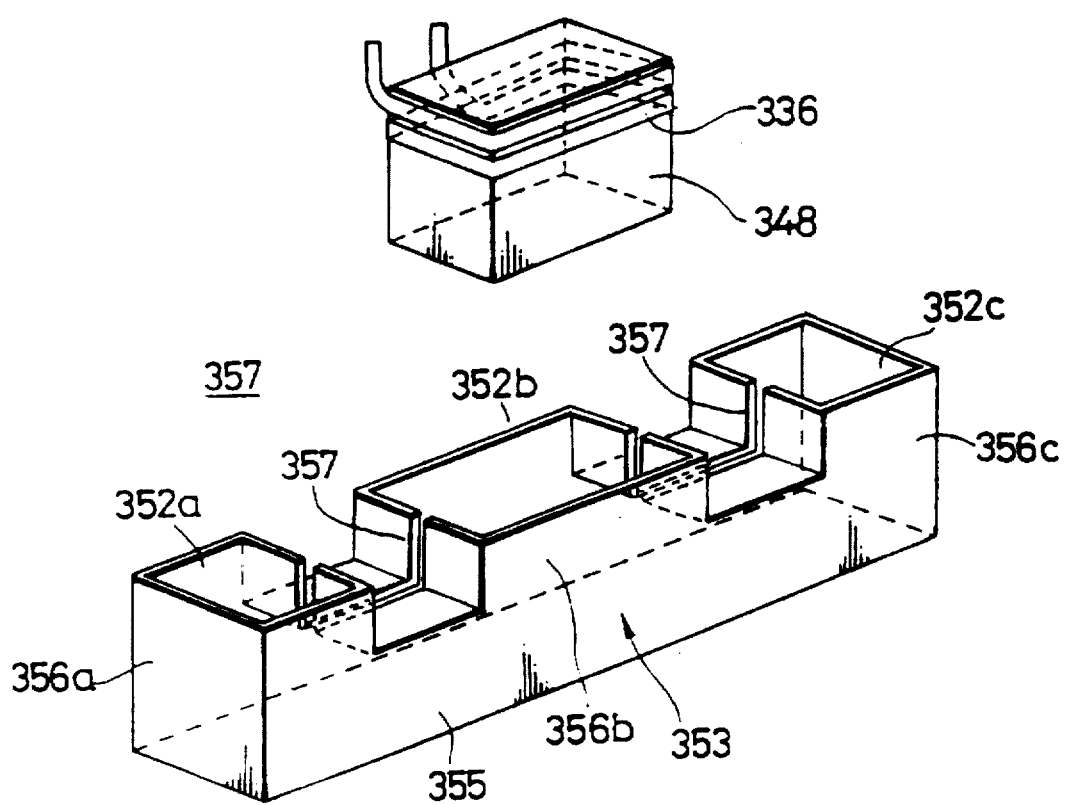
Figure 36:
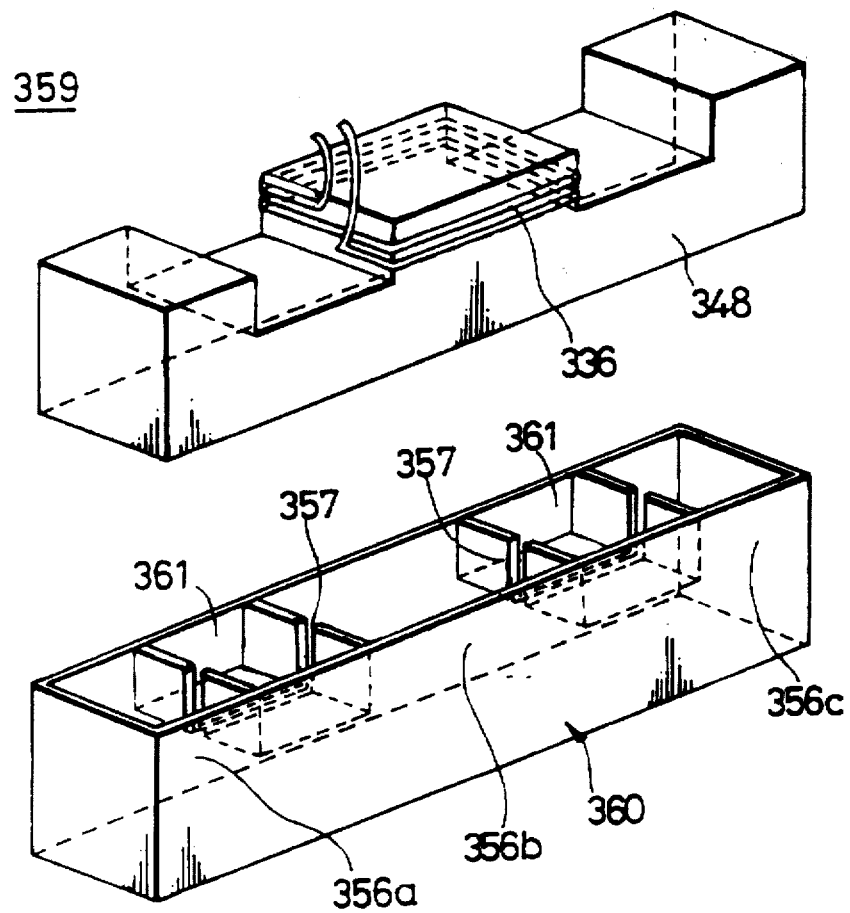
Figure 37:
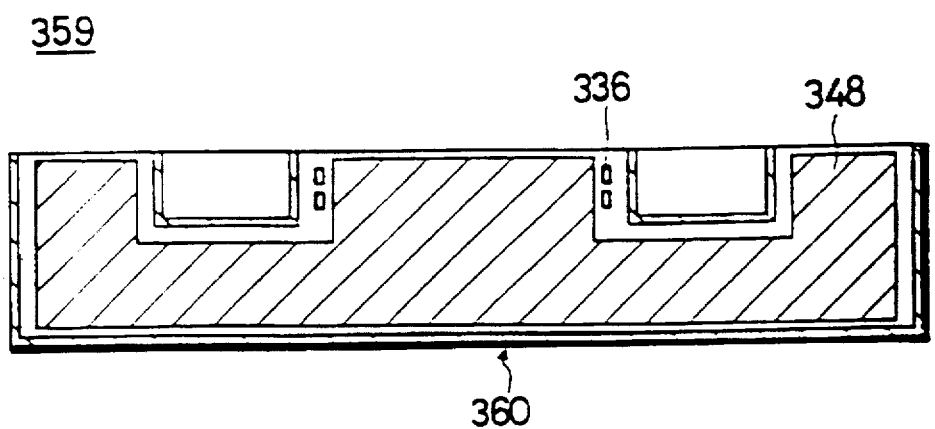
Figure 38:
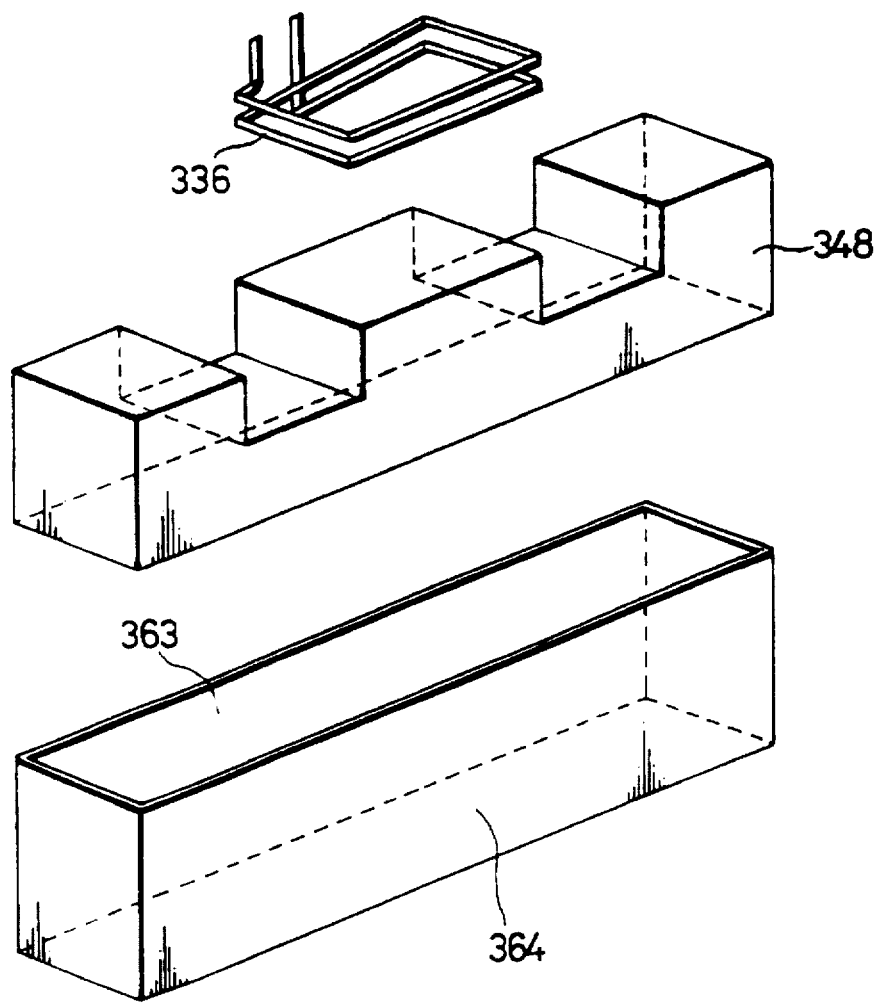
Figure 39:
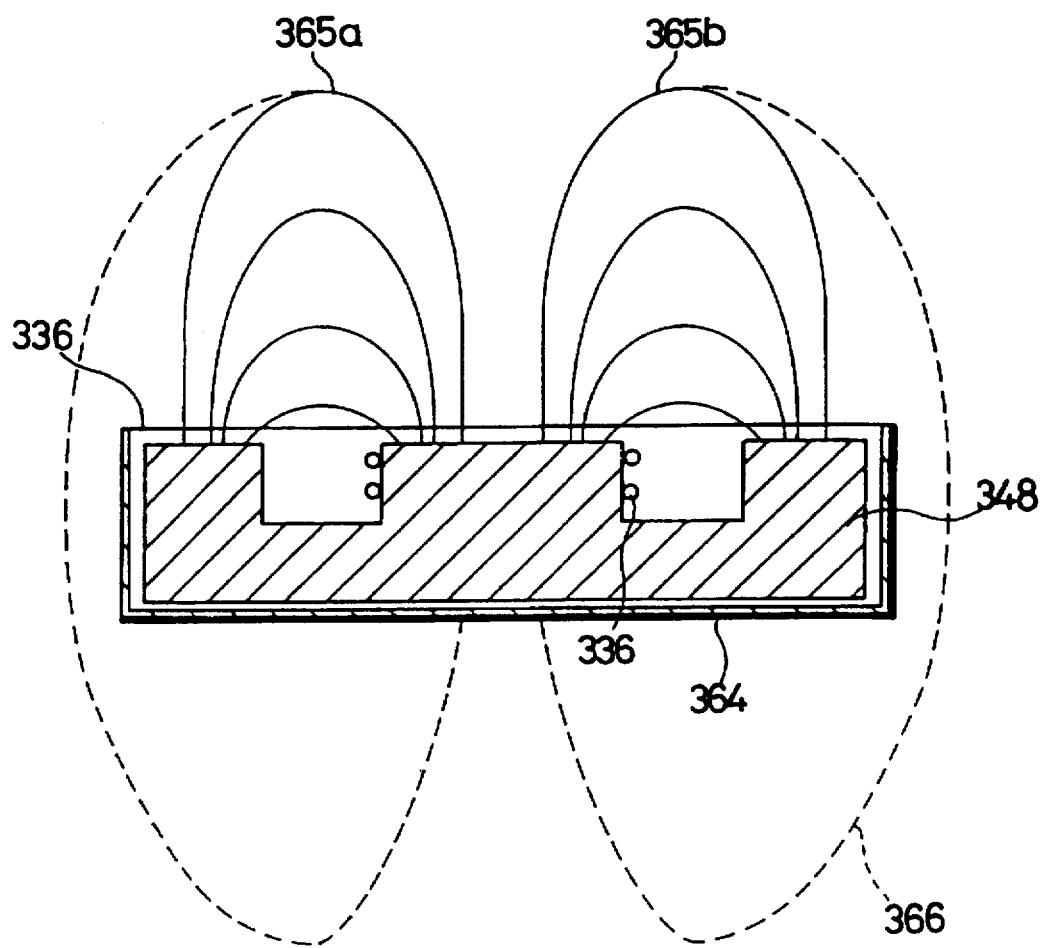
Figure 40:
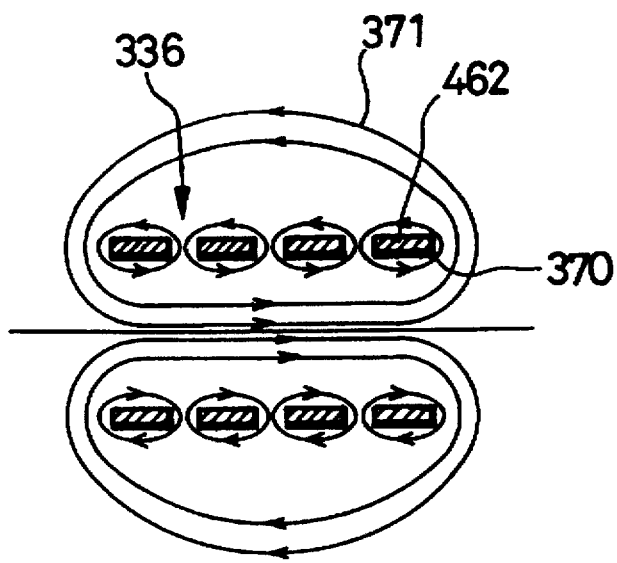
Figure 41:
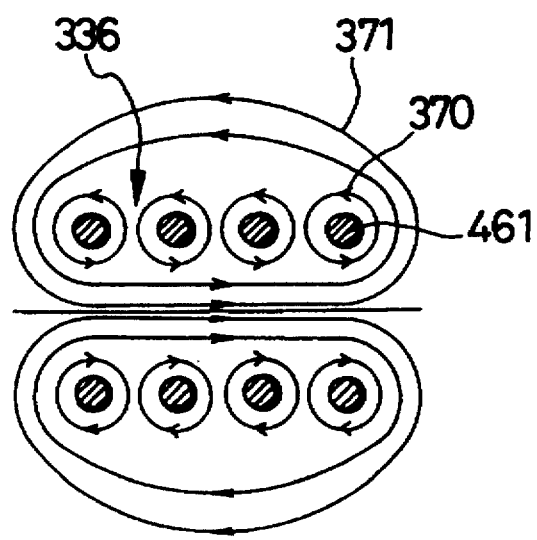

PIG. 12 is a schematic diagram used to explain the state of magnetic fluxes generated in the short-distance communication antenna according to the present invention;

FIG. 13 is a plan view showing a short-distance communication antenna according to a third embodiment of the present invention;

FIG. 14 is a cross-sectional view of the short-distance communication antenna shown in FIG. 13;

FIG. 15 is a plan view showing a short-distance communication antenna according to a fourth embodiment of the present invention;

FIG. 16 is a plan view showing a short-distance communication antenna according to a fifth embodiment of the present invention;

FIG. 17 is a perspective view of the short-distance communication antenna shown in FIG. 16;

FIG. 18 is a plan view showing a short-distance communication antenna according to a sixth embodiment of the present invention;

FIG. 19A is a plan view showing an example of a winding apparatus used to manufacture a short-distance communication antenna according to a first manufacturing method of the present invention;

FIG. 19B is a front view thereof;

FIG. 19C is a side view thereof;

FIG. 20 is a front view showing an automatic winding machine used to manufacture a short-distance communication antenna according to a second manufacturing method of the present invention;

FIG. 21 is a plan view of the automatic winding machine shown in FIG. 20;

FIG. 22 is a table showing the order of operation of a winding head of the automatic winding machine which incorporates therein the winding apparatus shown in FIGS. 19A to 19C;

FIG. 23A is a plan view showing other example of a winding apparatus used to manufacture a short-distance communication antenna according to a third manufacturing method of the present invention;

FIG. 23B is a front view thereof;

FIG. 23C is a side view thereof;

FIG. 24 is a table showing the order of operation of a winding head of the automatic winding machine which incorporates therein the winding apparatus shown in FIGS. 23A to 23C;

FIG. 25 is a perspective view showing a short-distance communication antenna according to a seventh embodiment of the present invention;

FIG. 26 is a perspective view used to explain the short-distance communication antenna shown in FIG. 25;

FIG. 27 is a schematic diagram used to explain an action of a magnetic field generated in the short-distance communication antenna shown in FIG. 25;

FIG. 28 is a perspective view showing a comparative example of a short-distance communication antenna;

FIG. 29 is a plan view showing a method of using a short-distance communication antenna according to the present invention;

FIG. 30 is a perspective view showing a short-distance communication antenna according to an eighth embodiment of the present invention;

FIG. 31 is an exploded perspective view showing a short-distance communication antenna according to a ninth embodiment of the present invention;

FIG. 32 is a cross-sectional view of the short-distance communication antenna shown in FIG. 31;

FIG. 33 is an exploded perspective view showing a short-distance communication antenna according to a tenth embodiment of the present invention;

FIGS. 34A through 35G are respectively cross-sectional views showing examples of a ferrite core used in the short-distance communication channel according to the present invention;

FIG. 36 is an exploded perspective view showing a short-distance communication antenna according to an eleventh embodiment of the present invention;

FIG. 37 is a cross-sectional view of the short-distance communication antenna shown in FIG. 36;

FIG. 38 is an exploded perspective view showing a short-distance communication antenna according to a twelfth embodiment of the present invention;

FIG. 39 is a cross-sectional view of the short-distance communication antenna shown in FIG. 38;

FIG. 40 is a schematic diagram used to explain an example of a flat type wire coil; and FIG. 41 is a schematic diagram used to explain an example of a round type wire coil.

DETAILED DESCRIPTION OF THE PREFERRED EMBODIMENTS

Referring to the drawings in detail and initially to FIGS. 1, 6 and 7, a short-distance communication antenna 45 according to a first embodiment of the present invention will be described hereinafter.

Figure 1:
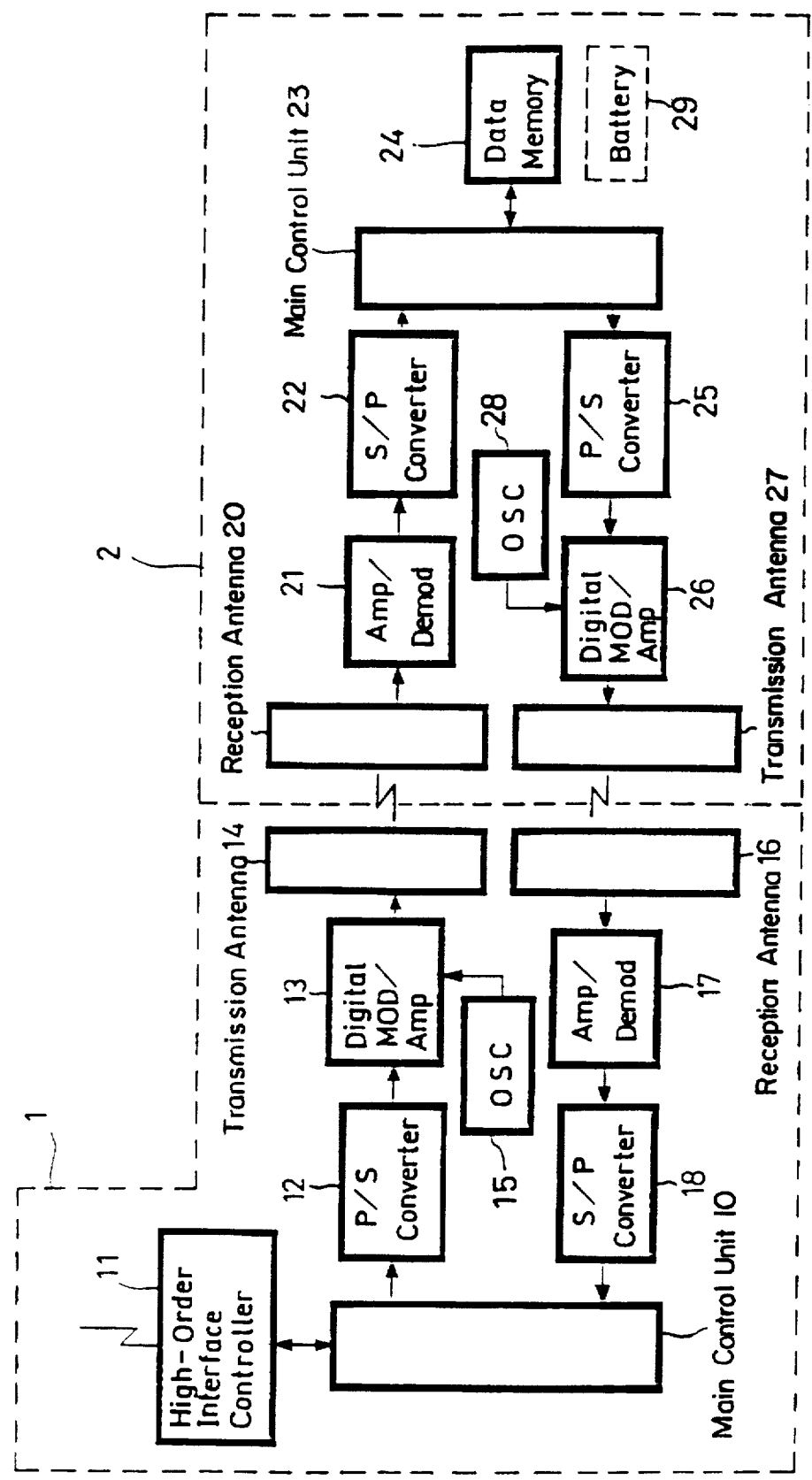
FIG. 1 is a schematic block diagram showing an example of an information card system.

Also in this embodiment, as shown in FIG. 1, the digital signal of transmission information from the main control unit 10 is converted in the form of serial data by the P/S converter 12 to the digital modulator/amplifier 13, in which it is modulated in a digital modulation fashion, such as the ASK modulation and then amplified. The digital modulated signal obtained at the output side of the digital modulator/amplifier 13 is supplied to the transmission antenna 14.

Figure 6:
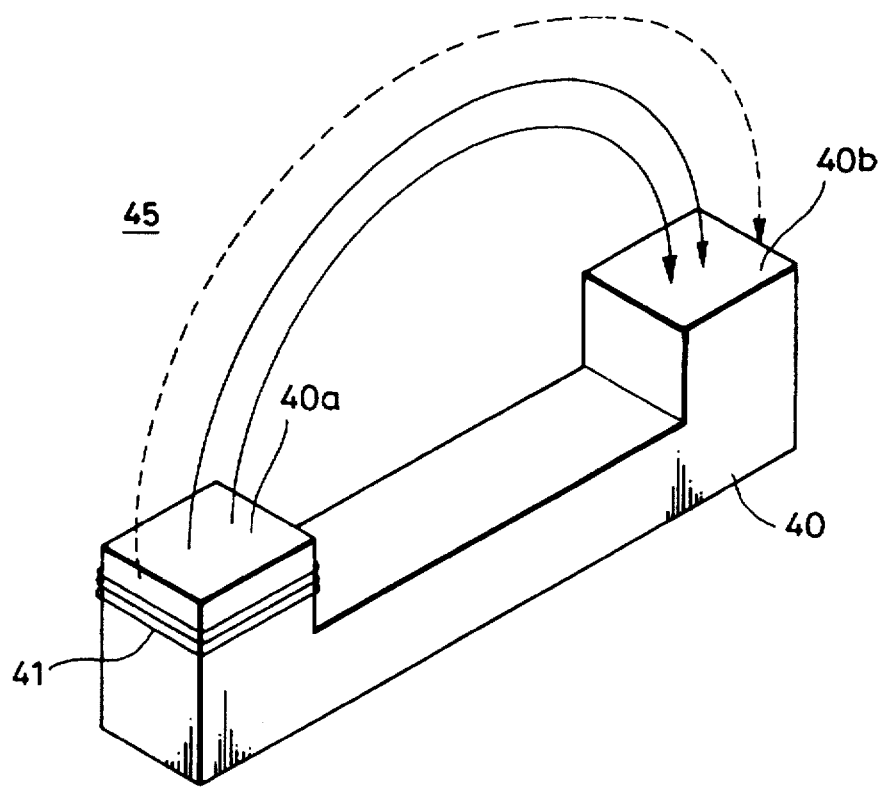
FIG. 6 is a perspective view showing a short-distance communication antenna according to a first embodiment of the present invention.
Figure 7:
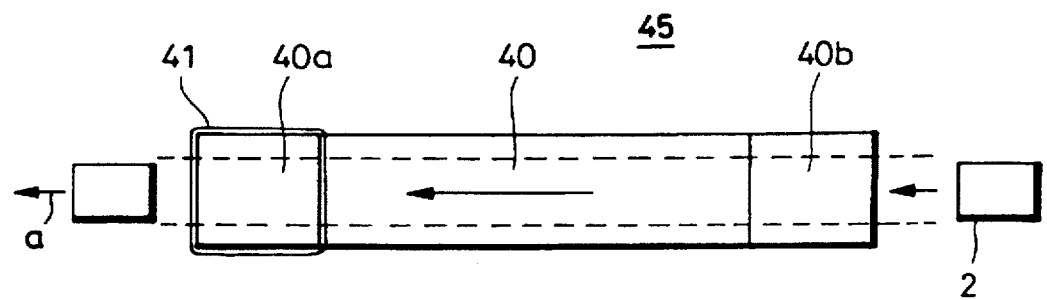
FIG. 7 is a diagram used to explain the short-distance communication antenna shown in FIG. 6.

According to this embodiment, a short-distance communication antenna 45 such as the transmission antenna 14 of the information card system is arranged as shown in FIGS. 6 and 7.

As shown in FIG. 6 and 7, a magnetic core 40 of U-letter configuration is made of a ferromagnetic material and includes two magnetic poles 40a, 40b. The magnetic core 40 of the U-letter configuration is disposed such that the two magnetic poles 40a and 40b thereof are laid along a scanning direction a of the non-contacting information card 2 as shown in FIG. 7.

Further, in accordance with this embodiment, an antenna wire 41 is wound around the magnetic pole 40a of the magnetic core 40 of U-letter configuration. The digital modulated signal obtained at the output side of the digital modulator/amplifier 13 is supplied to the antenna wire 41.

Figure 2:
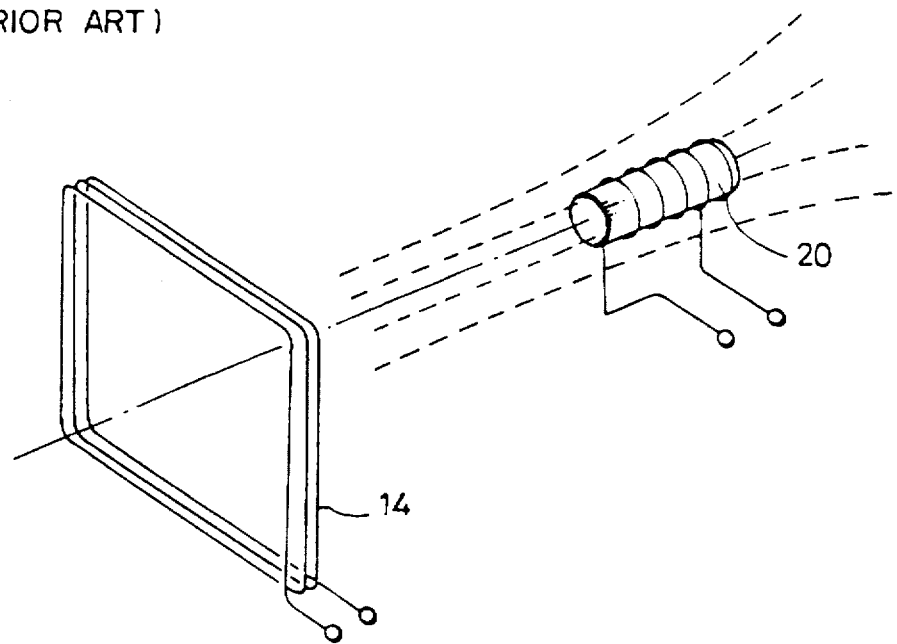
FIG. 2 is a schematic perspective view used to explain electromagnetic induction.
Figure 3:
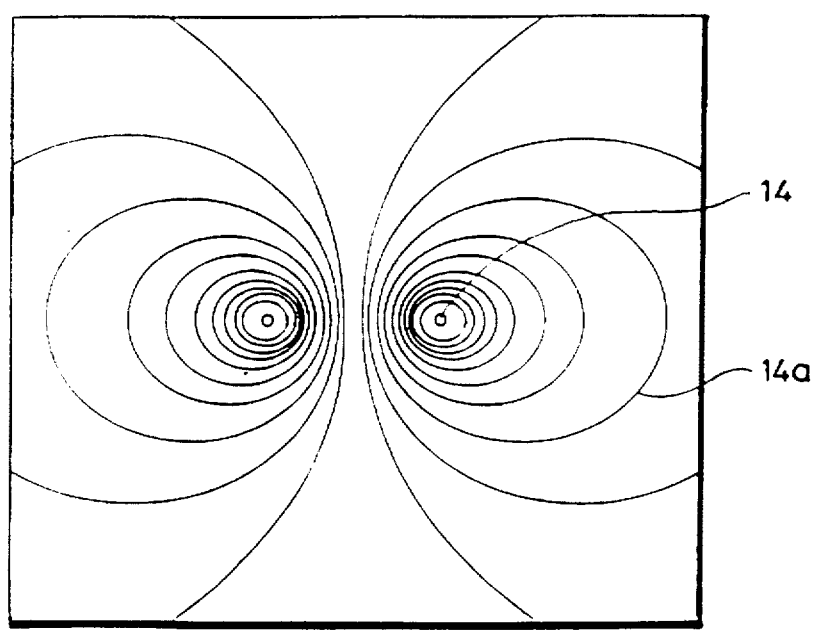
FIG. 3 is a schematic diagram used to explain a loop antenna.
Figure 4:
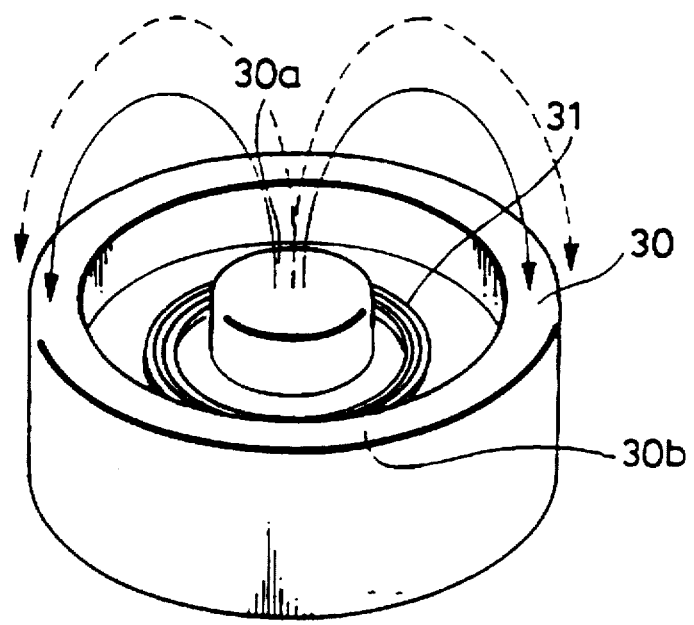
FIG. 4 is a perspective view showing an example of a short-distance communication antenna.
Figure 5:
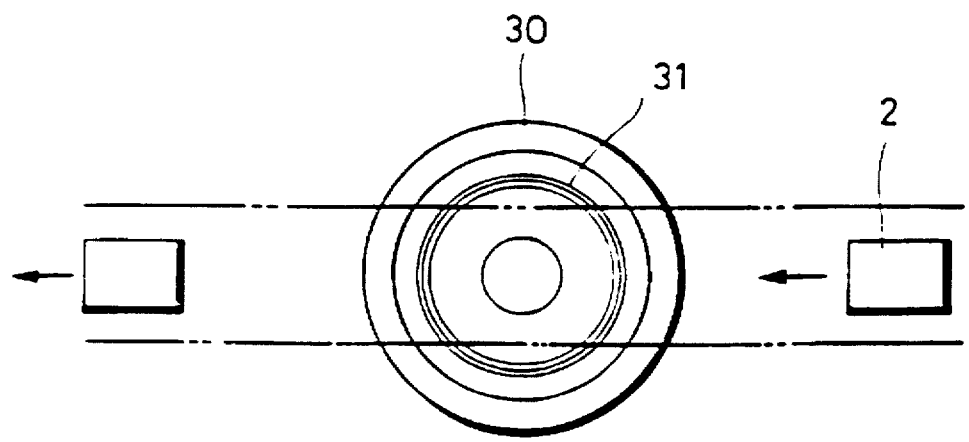
FIG. 5 is a plan view used to explain the short-distance communication antenna shown in FIG. 4.

Furthermore, in accordance with this embodiment, the direction connecting the two magnetic poles 40a and 40b of the magnetic core 40 is set to the scanning direction a. Also, a predetermined surface of the non-contacting information card 2 arranged as shown in FIG. 2 is opposed to the antenna 45.

According to this embodiment, as described above, since the two magnetic poles 40a and 40b of the magnetic core 40 of U-letter configuration are disposed along the scanning direction a of the non-contacting information card 2, a main magnetic flux and a leakage magnetic flux generated from the antenna wire 41 are generated only in the scanning direction a of the non-contacting information card 2 which is placed between the magnetic poles 40a and 40b as shown by a solid line and a dotted line in FIG. 6. Since the intensity of this magnetic field has a directivity, leakage of the magnetic flux to the outside of the communication area is small and therefore the communication area can be extended within the regulation range of the radio law, thereby making it possible to satisfactorily transmit and receive information. Also, since the leakage of magnetic flux is small, the communication can be substantially prevented from being affected by any metal material existing near the communication antenna.

Further, according to this embodiment, since the intensity of the magnetic field has a directivity in the scanning direction a of the non-contacting information card 2, magnetic flux density can be improved and transmission and reception efficiency can be improved.

While the magnetic core of U-letter configuration having the two magnetic poles 40a, 40b is used as the magnetic core 40 as described above, the present invention is not limited thereto and the magnetic core may have three magnetic poles or more disposed along one direction. In this case, if the magnetic core has four magnetic cores or more, the antenna wire 41 should preferably be wound around a plurality of magnetic poles.

As described above, according to the first embodiment of the present invention, since the leakage of magnetic flux to the outside of the communication area is small, satisfactory transmission and reception can be made within the regulation range of the radio law. Also, since the leakage of magnetic flux is small, communication can be substantially prevented from being affected by any metal material existing near the communication antenna.

Furthermore, according to the first embodiment of the present invention, since the intensity of the magnetic field has a directivity in the scanning direction of the non-contacting information card, magnetic flux density can be improved and therefore the transmission and reception efficiency can also be improved.

Figure 8:
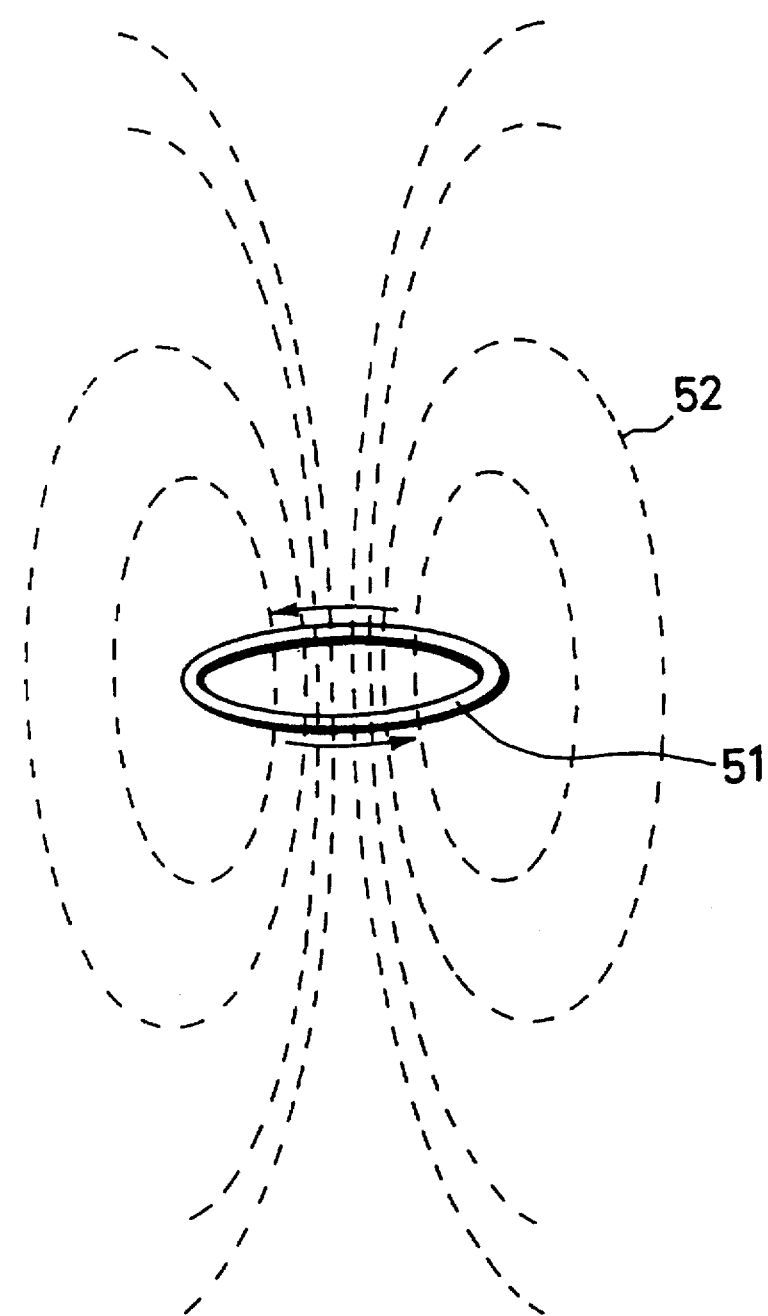
FIG. 8 is a schematic diagram showing a state of magnetic fluxes generated in the loop antenna.

If an annular loop antenna 51 shown in FIG. 8 is used as the comparative example of the communication antenna for the card reader/writer 1 shown in FIG. 1, then the loop antenna 51 generates a magnetic flux 52 which encircles the loop of the loop antenna 51 as shown by a dotted line in FIG. 8.

Figure 9B:
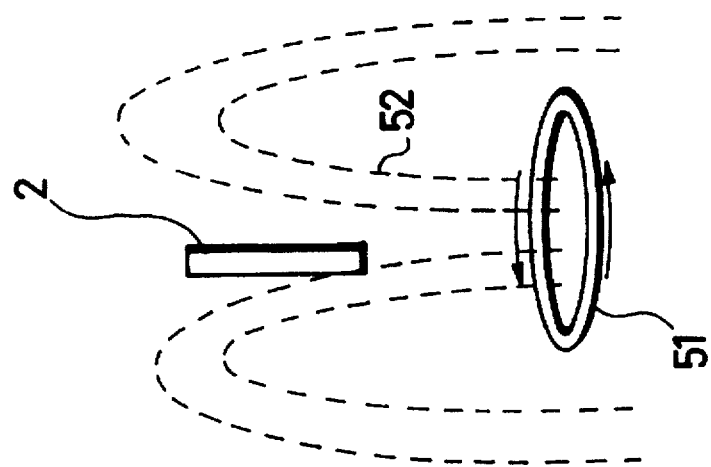
FIG. 9B is a schematic diagram used to explain a relationship between a non-contacting information card placed at a right angle with respect to the loop antenna.
Figure 9A:
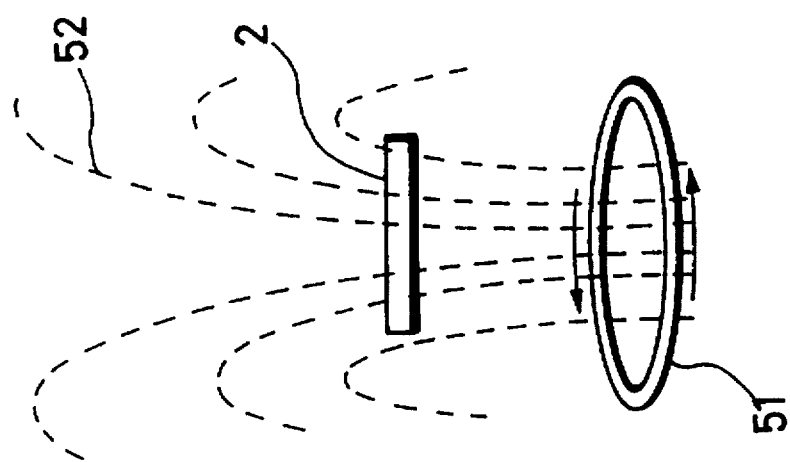
FIG. 9A is a schematic diagram used to explain a relationship between a non-contacting information card placed horizontally with respect to the loop antenna.

Accordingly, if the non-contacting information card 2 is placed in parallel to the loop antenna 51 as shown in FIG. 9A, then electric power can be transmitted most efficiently between the card reader/writer 1 and the non-contacting information card 2. However, it is substantially impossible for the non-contacting information card 2 to constantly communicate with the communication card 2 at such position.

For example, when the non-contacting information card 2 is placed at a right angle relative to the loop antenna 51 as shown in FIG. 9B, electric power efficiency can be lowered considerably.

To improve the electric power efficiency, it is proposed to raise the level of the magnetic field generated from the communication antenna 51. This previously-proposed method is not preferable because it tends to affect devices provided near the communication antenna 51 and is somewhat restricted by the radio law.

Therefore, there is an increasing demand for a new technique in which electric power can be transmitted efficiently regardless of the positional direction of the non-contacting information card 2 upon reception relative to the communication antenna.

A communication antenna according to an second embodiment of the present invention which can satisfy the above demand will be described below.

FIG. 10 is a plan view and FIG. 11 is a cross-sectional view each showing a communication antenna for the card reader/writer 1, i.e., short-distance communication antenna which serves as the transmission antenna 14 and the transmission and reception antenna 16 according to the second embodiment of the present invention.

The inventive short-distance communication antenna 61 includes adjacent two loop coils 63A and 63B which are formed by turning an antenna conductor 62 in a loop fashion so as to have the loops cross each other at their intermediate portion, i.e., in the shape of the symbol infinity in a plane. In the two loop coils 63A and 63B, a current i flows in opposite directions. Feeding terminals 64A and 64B are led from the respective ends of the antenna conductor 62.

Figure 12:
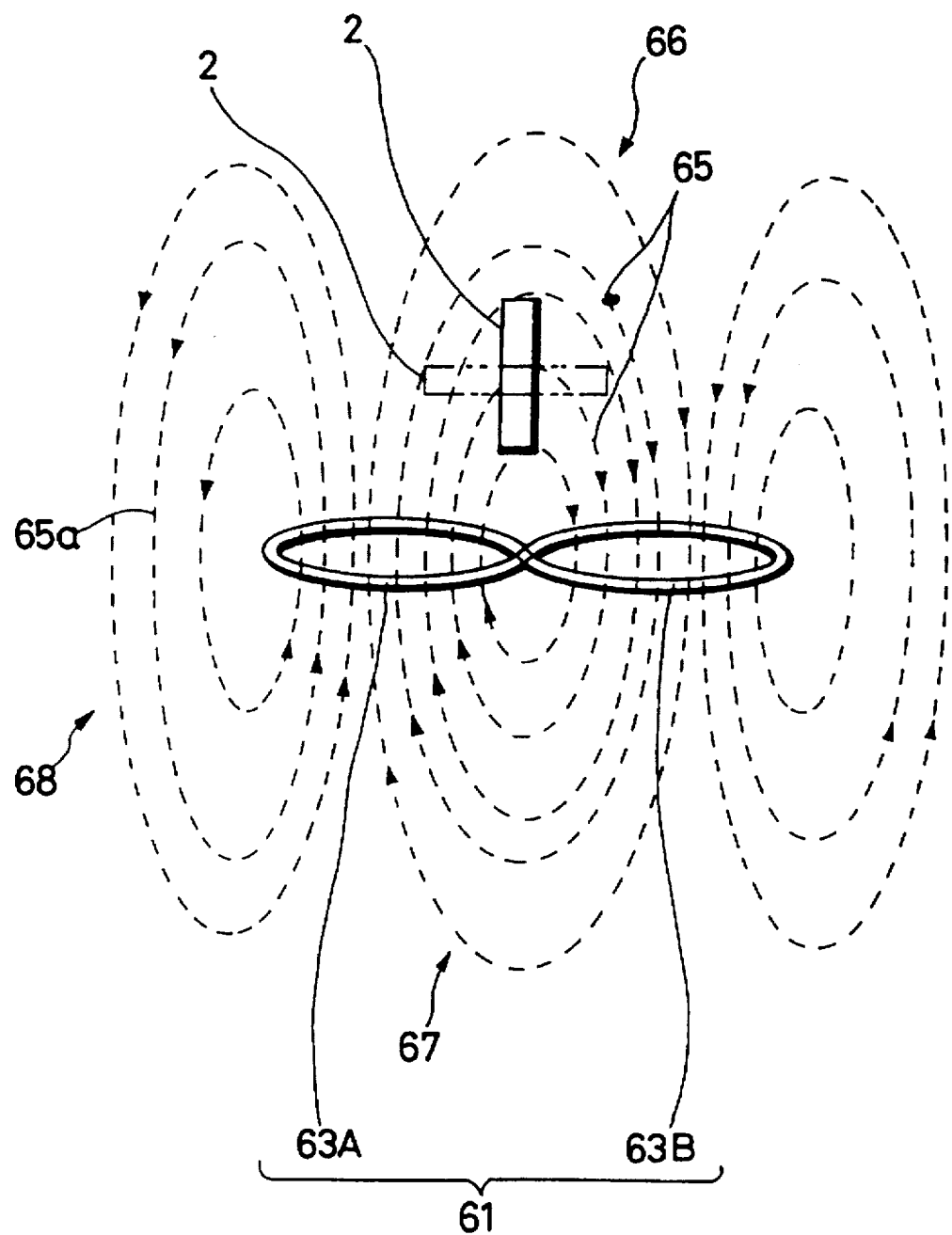

Since the current i flows in opposite directions in the two loop coils 63A and 63B of the short-distance communication antenna 61, as shown in FIG. 12, a magnetic flux 65 generated from one loop coil 63A is returned to the other adjacent loop coil 63B. Accordingly, the magnetic flux 65 is closed at portions 66 and 67 corresponding to the portion between the adjacent loop coils 63A and 63B. Further, the magnetic flux 65 is multiplied with magnetic fluxes generated from the left and right loop coils 63A and 63B so that the magnetic flux densities of the portions 66 and 67 increase. Therefore, a sufficient induced voltage can be generated in the non-contacting information card 2 disposed within the two portions 66 and 67 by electromagnetic induction.

Upon communication, the non-contacting information card 2 is moved over the portion 66 or 67 with an inclination angle with respect to the antenna 61. In this case, since the magnetic flux 65 of the antenna 61 is closed, the non-contacting information card 2 can reliably communicate with the card reader/writer 1 regardless of the direction, i.e., inclination angle of the non-contacting information card 2 relative to the antenna 61.

Specifically, when the non-contacting information card 2 is placed at a right angle relative to the plane of the loop antenna 61 which is the short-distance communication antenna on the portion 66 or 67 (portion 66 in FIG. 12) as shown by a solid line in FIG. 12 or when the non-contacting information card 2 is placed in parallel to the plane of the loop antenna 61 as shown by a two-dot chain line in FIG. 12, in either case, the card reader/writer 1 and the non-contacting information card 2 can reliably communicate with each other.

That is, according to the second embodiment, regardless of the inclination angle of the non-contacting information card 2 relative to the loop antenna 61, the transmission efficiency of electric power can be improved as compared with that of an antenna having a single loop.

When a communication is made by effectively utilizing the portions 66 and 67 where the magnetic flux 65 of the short-distance communication antenna 61 is closed as shown in FIG. 12, if the magnetic flux 65 of the portions 66 and 67 is suppressed to the minimum, then a magnetic field 65a of a portion 68 corresponding to the antenna end portion becomes weaker. Therefore, it is possible to reduce the disturbance exerted on adjoining devices.

In the short-distance communication antenna 61, the operation area of the non-contacting information card 2 can be limited to only the areas of the portions 66 and 67 corresponding to the area between the adjacent loop coils 63A and 63B.

FIG. 13 is a plan view and FIG. 14 is a cross-sectional view each showing a short-distance communication antenna 71 according to a third embodiment of the present invention.

The inventive short-distance communication antenna 71 includes adjacent two loop coils 63A and 63B which are formed by turning an antenna conductor 62 in a loop fashion so as to have the loops cross each other at their intermediate portion, i.e., in the shape of the symbol infinity, as shown in a plan view of FIG. 13 similar to FIG. 10. In particular, the two loop coils 63A and 63B are bent such that an angle 8 formed by the two loop coils 63A and 63B is smaller than 180°.

When the two loop coils 63A and 63B are bent as described above, the communication antenna 71 has a directivity so that the operation area of the non-contacting information card 2 can be reduced. Moreover, a space for installing the communication antenna 71 can be reduced.

FIG. 15 is a plan view showing a short-distance communication antenna 83 according to a fourth embodiment of the present invention.

As shown in FIG. 15, the short-distance communication antenna 83 includes, in this embodiment, three adjacent loop coils 84A, 84B and 84C which are formed by winding a single antenna conductor 62 in a loop fashion. In the three loop coils 84A, 84B and 84C, a current i flows in opposite directions. The feeding terminals 64A and 64B are led out from the respective ends of the antenna conductor 62.

In the short-distance communication antenna 83, a magnetic flux generated from the central loop coil 84B is returned to the respective loop coils 84A and 84C that adjoin the central loop coil 84B. Accordingly, the magnetic fluxes are closed in the areas corresponding to the crossing portions of the antenna conductor 62 between the adjacent loop coils 84A and 84B and the adjacent loop coils 84B and 84C. As a result, the area of high magnetic flux density is expanded so that the operation area of the non-contacting information card 2 can be extended by an arbitrary distance. That is, the operation area of the non-contacting information card 2 can be enlarged.

At that time, during the loop coils 84A and 84C are wound by one turn, only the loop coil 84B is wound by two turns. Thus, the ratio of the turns of loop coil 84A:loop coil 84B:loop coil 84C can be set to 1:2:1.

As described above, it is possible to freely set the operation area of the non-contacting information card 2 by selecting the above-mentioned embodiments.

FIG. 16 is a plan view and FIG. 17 is a perspective view each showing a short-distance communication antenna according to a fifth embodiment of the present invention.

An inventive short-distance communication antenna 90 includes an insulating base 91, a conductor pattern 92 of an inverted S-letter shape serving as an antenna conductor formed on an upper surface 91a of the insulating base 91 and a conductor pattern 93 of an inverted S-letter shape serving as an antenna conductor formed on a lower surface 91b of the base 91 so as to cross the conductor pattern 92 of the inverted S-letter shape formed on the upper surface 91a at its intermediate portion. One ends of the conductor patterns 92 and 93 are connected via a through-hole 94. The two conductor patterns, i.e., the antenna conductor patterns 92 and 93, form adjacent two loop coils 95A and 95B in which the current i flows in opposite directions as shown in a plan view of FIG. 16. Feeding terminals 96A and 96B formed of conductor patterns are led out from the respective ends of the loop coils 95A and 95B.

Also in this short-distance communication antenna 90, since the current i flows in the adjacent loop coils 95A and 95B in opposite directions similarly to the example of FIG. 10, a magnetic flux generated from one loop coil 95A is returned to the other loop coil 95B, thereby the magnetic flux being closed.

Accordingly, similar to the example of FIG. 10, a sufficient induced voltage can be generated in the non-contacting information card 2. Moreover, the card reader/writer 1 and the non-contacting information card 2 can reliably communicate with each other regardless of the inclination angle of the non-contacting information card 2 relative to the plane of the communication antenna 90.

FIG. 18 is a plan view showing a short-distance communication antenna according to a sixth embodiment of the present invention.

As shown in FIG. 18, an inventive short-distance communication antenna 100 differs from the short-distance communication antenna 90 only in that a plurality of adjustment strips (metal foil strips) 101 are formed on the upper surface 91a of the insulating base 91 together with the conductor patterns, i.e., antenna conductor patterns 92 and 93.

While the short-distance communication antenna 100 can achieve action and effect similar to those of the short-distance communication antenna 90 of the example shown in FIG. 16, since the short-distance communication antenna 100 includes the adjustment strips 101, the influence exerted upon devices disposed around the antenna can be removed and fluctuations brought when the antenna conductor patterns 92, 93 are manufactured can be corrected.

The adjustment can be carried out with ease by properly removing the adjustment strip 101.

The antenna conductor patterns 92, 93 or the adjustment strips 101 shown in FIGS. 16 and 18 can be formed by treating conductive foils or conductive layers deposited on the insulating base 91 by chemical selective etching. According to the short-distance communication antennas 90 and 100, the antenna conductor patterns 92, 93 or the adjustment strips 101 can be placed and sized with high accuracy by chemical etching. Therefore, a number of loop coils 95A, 95B of the same size can be formed at predetermined positions and are suitable for being mass-produced.

Further, in the short-distance communication antenna 90, since the loop coils 95A, 95B are composed of the conductor patterns 92, 93 formed on both surfaces 91a, 91b of the insulating base 91, the two loop coils 95A, 95B can be manufactured with high accuracy in compact. Also, the short-distance communication antenna can be located with ease.

While the two loop coils 95A and 95B are formed in the examples of FIGS. 16 and 18 as described above, the present invention is not limited thereto and three loop coils or more may be formed.

While the loop coils 63A, 63B, 84A, 84B, 84C, 95A and 95B are each shaped as a proper circle as shown in the plan views, the present invention is not limited thereto and they may be each shaped as any suitable shape, such as an oblong ellipse or a rectangle. Further, the antenna conductors 62 shown in FIGS. 10, 13 and 15 are formed of a line-shaped antenna wire and therefore can be wound many times around the thickness direction of the antenna.

A method of manufacturing a short-distance communication antenna according to the present invention will be described below.

As shown in FIGS. 19A to 19C, initially, there is prepared a winding apparatus 204 including a common base 201 on which a pair of bobbins 202, 203 are disposed with a predetermined spacing therebetween in an opposing relation. An antenna conductor is wound around the pair of bobbins 202, 203 of the winding apparatus 204 in an S-letter shape, for example, manually. Specifically, the antenna conductor is alternately wound around the two bobbins 202, 203 in opposite directions, such that the antenna conductor is wound around the left bobbin 202 in a counter-clockwise direction and the antenna conductor is wound around the right bobbin 203 in a clockwise direction.

By using the winding apparatus 204, it is possible to manufacture with ease the inventive short-distance communication antenna 61 shown in FIG. 10, for example, manually.

When a frequency at which the antenna conductor overlaps at the crossing portion between the left and right antenna loops is reduced, after the antenna conductor is wound around the left bobbin 202 a plurality of times (e.g., twice or greater) as a unit, and the antenna conductor is wound around the right bobbin 203 the same number of times, thereby making it possible to manufacture the target short-distance communication antenna.

Other manufacturing methods according to the present invention will be described below. In this manufacturing method, it is possible to manufacture the short-distance communication antenna by using an automatic winding machine shown in FIGS. 20 and 21.

According to this example, as shown in FIGS. 20 and 21, an automatic winding machine 209 comprises the winding apparatus 204 shown in FIGS. 19A to 19C mounted on a work table 206 such that the winding apparatus 204 can be reciprocated only in one direction b. Also, this automatic winding machine 209 includes a rotary arm 208 attached thereto having an antenna conductor supply head (i.e., so-called winding head) 207 which is mounted on the work table 206. As shown in FIG. 21, the rotary arm 208 can be rotated about a rotary shaft 210 such that the rotary arm 208 reciprocates in the direction crossing the reciprocating direction b of the winding apparatus 204, i.e., in a direction c perpendicular to the reciprocating direction b. The antenna conductor 62 is moved along the rotary arm 208 and supplied to the antenna conductor supply head 207 attached to the rotary arm 208.

In the automatic winding machine 209, when the rotary arm 208 is rotated about the rotary shaft 210 so as to reciprocate while the winding apparatus 204 is reciprocated only in one direction b, similarly to the manual operation, the antenna conductor 62 is wound around the bobbins 202, 203 of the winding apparatus 204 in an S-letter shape, thus to make, for example, the inventive short-distance communication antenna 61 of FIG. 10 composed of the two loop coils 63A, 63B. The antenna conductor 62 may of course be wound around the bobbins 202, 203 a plurality of times.

FIG. 22 shows the order wherein the antenna conductor supply head 207 is operated. The order wherein the antenna conductor supply head 207 is operated and the positions thereof are illustrated by (1) through (8). A column (A) shows the positions at which the antenna conductor supply head 207 is placed in the sequential order when the antenna conductor supply head 207 is operated in accordance with the left and right movement of the winding apparatus 204 in the direction b. A column (B) shows positions at which the antenna conductor supply head 207 is placed in the sequential order when the antenna conductor supply head 207 is operated in accordance with the rotational displacement of the rotary arm 208 in the direction c. When the antenna conductor supply head 207 and the winding apparatus 204 are spaced apart with respect to the horizontal axis (e.g., (1) and (2) in the column (A) and (2) and (3) in the column (B)), the movement amount or the rotational displacement amount is large. When the antenna conductor supply head 207 and the winding apparatus 204 are placed side by side (e.g., (2)

and (3) in the column (A) and (1) and (2) in the column (B)), the movement amount or the rotational displacement amount is small.

It is possible to manufacture the short-distance communication antenna 61 shown in FIG. 10 by reciprocating the winding apparatus 204 and the rotary arm 208 in the manner shown in FIG. 22.

Further, it is possible to reduce the frequency at which the antenna conductor 62 overlaps at the crossing portion by winding the antenna conductor 62 around the left and right bobbins 202, 203 a plurality of times as a unit similarly in a manual fashion while the operations on the columns (A) and (B) are changed.

In the automatic winding machine 209 shown in FIGS. 20 and 21, if a power source of the winding apparatus 204 and the rotary arm 208 is formed of a suitable motor, such as a stepping motor which operates in a straight line fashion, then the automatic winding machine can be made simple and inexpensive. Moreover, the loop coils whose winding types, such as one turn or two turns, are different can be switched with ease, which is very economical.

FIGS. 23A to 23C and FIG. 24 show a further example of a method of manufacturing a short-distance communication antenna composed of three loop coils.

As shown in FIGS. 23A to 23C, there is prepared a winding apparatus 215 having a common base 211 on which three bobbins 212, 213, 214 are arrayed with a predetermined spacing between adjacent ones.

This winding apparatus 215 is mounted on the automatic winding machine 209 shown in FIGS. 20 and 21 instead of the winding apparatus 204. By reciprocating the winding apparatus 215 and the rotary arm 208 along the operation positions (a) to (h) and the operation orders (1) to (12) of the antenna conductor supply head 207 as shown in FIG. 24, it is possible to manufacture the inventive short-distance communication antenna 83 shown in FIG. 15, for example.

The table of FIG. 24 is described in the same way as that of the table of FIG. 22 and therefore need not be described in detail.

In the case of the table shown in FIG. 24, the ratio of the number of the turns of the antenna conductor wound on the bobbins 212, 213, 214 is set to 1:1:1. In this case, if the antenna conductor 62 is wound around the bobbins 212, 213, 214 repeatedly twice only in the operation orders (1) to (4), then of the three loop coils thus made, the number of turns of the central loop coil becomes twice those of the left and right loop coils. With this arrangement of the loop coils, the amount of generated magnetic fluxes can be well balanced.

According to the inventive short-distance communication antenna, the portion in which the magnetic flux is closed is formed by forming a plurality of loop coils. Moreover, the magnetic flux density of that portion increases due to the synergism of the magnetic flux from the adjacent loop coil, thereby making it possible for the card reader/writer 1 and the non-contacting information card 2 to communicate with each other satisfactorily. Also, regardless of the direction (inclination) of the non-contacting information card 2 upon reception, it is possible for the non-contacting information card 2 to efficiently receive the magnetic field accompanied with the information signal.

Therefore, the direction of the non-contacting information card can be freely selected relative to the communication antenna of the card reader/writer.

Furthermore, it becomes possible to set a communication range obtained when the IC card system is operated in a predetermined area. Also, it is possible to reduce the disturbance exerted upon a device adjoining the IC card system.

According to the inventive method of manufacturing a short-distance communication antenna, it is possible to manufacture with high accuracy the short-distance communication antenna composed of a plurality of loop coils formed by crossing the antenna conductor in which the current flows in opposite directions.

A short-distance communication antenna according to the following embodiments of the present invention includes a metal housing having one or more than two apertures through which a magnetic flux is passed and a coil mounted on this metal housing, i.e., antenna coil. The housing should be made of a conductor, preferably made of a metal material and more preferably made of a copper plate. The material of the housing is not limited thereto so long as the material has a shield function.

When the housing has more than two apertures, a slit (groove) is formed through the housing so as to join the apertures to each other.

A size and a shape of the housing are not limited in particular. If the housing is shaped as U-letter or E-letter configuration, a magnetic flux is easily closed in one direction. Moreover, the magnetic flux direction of the antenna is extended along the direction wherein the non-contacting information card is moved. Thus, a communication range can be enlarged.

A magnetic member (magnetic core) can be inserted into the inside of the housing. The magnetic member can be inserted into a part or whole of the housing.

The magnetic member might generally be a ferrite core and the shape of the magnetic member is not limited so long as it can be inserted into the inside of the housing.

As for the coil, there can be used a coil formed by winding a conductor, a coil formed by winding a conductor around a bobbin, a coil formed by winding a conductor around a magnetic core or a coil formed by etching a conductor as a spiral coil.

The coil should preferably be formed by winding a flat type wire conductor without a space.

A short-distance communication antenna and a method of using the same according to embodiments of the present invention will be described below with reference to FIG. 25 and the following sheets of drawings.

Also in the following embodiments, as earlier noted with reference to FIG. 1, the digital signal of transmission information from the main control unit 10 is converted in the form of parallel-to-serial data by the P/S converter 12 and supplied to the digital modulator/amplifier 13, in which it is processed in a digital modulation fashion, such as the ASK modulation and then amplified. The modulated wave obtained at the output side of the digital modulator/amplifier 13 is supplied to the transmission antenna 14.

Also in the following embodiments, the transmission antenna 14 and the reception antenna 16 in the card reader/writer 1 shown in FIG. 1 can be formed of a single antenna which serves as both the transmission and reception antennas. Moreover, the reception antenna 20 and the transmission antenna 27 in the non-contacting information card 2 can be formed of a single antenna which serves as both the transmission and reception antennas. The transmission and reception antenna on the non-contacting information card 2 can be formed by etching a metal thin film or metal foil.

According to the following embodiments, the present invention is applied to a short-distance communication antenna which becomes the transmission antenna 14 or the transmission and reception antenna serving as both the transmission antenna 14 and the reception antenna 16 of this information card system.

FIG. 25 shows a short-distance communication antenna according to a seventh embodiment of the present invention and to which references will be made in explaining a principle of the present invention.

As shown in FIG. 25, an inventive short-distance communication antenna 331 is composed of a metal housing 335 of a U-letter shaped cylinder configuration in which upper end faces of vertical portions 333a, 333b extended from respective ends of a horizontal portion 332 in the vertical direction are formed as apertures 334a, 334b and a transmission and reception coil (i.e., so-called antenna coil) 336 mounted on the housing 335. The housing 335 is formed of a metal having a magnetic shield function, i.e., non-magnetic conductor, e.g., copper. This housing 335 becomes a conductive magnetic cylinder for introducing a magnetic flux generated from the antenna coil 336 along the inside of the housing 335. The housing 335 is made at its portion where the magnetic flux travels by an air or plastic material and the portion surrounding that portion is surrounded by a metal plate.

The coil 336 is wound around the inner peripheral surface of one vertical portion 333b of the housing 335.

The coil 336 can be mounted on another position within the housing 335 or can be wound around the outside of the housing 335.

As shown in FIG. 26, the cylindrical housing 335 includes a short-circuit circuit crossing a magnetic path formed by the coil 336, i.e., a slit (groove) 337 in order to prevent currents i1, i2, i3 from being induced. The slit 337 is extended over the whole length of the conductive magnetic cylinder inside of the U-letter configuration thereby extending over the horizontal portion 332 and the two vertical portions 333a, 333b and joining the two apertures 334a and 334b.

An action of the short-distance communication antenna 331 thus arranged will be described below.

The coil 336 disposed within the metal housing 335 generates a magnetic flux accompanied by the information signal in all directions. Specifically, as shown in FIG. 26, the magnetic flux is generally classified as a magnetic flux S which is generated from one aperture 334a to the outside of the housing 335 and returned from the other aperture 334b to the inside of the housing 335 and a magnetic flux P which intends to pass the metal plate of the housing 335.

Having considered a high frequency alternating magnetic flux, as shown in FIG. 27, of the magnetic flux P that intends to pass the metal plate of the housing 335, a component R which is perpendicular to the metal plate of the housing 335 generates an eddy current in the metal plate of the housing 335. A magnetic flux -R generated by the eddy current is generated in the direction to cancel the original magnetic flux R. As a result, the metal plate of the housing 335 acts as a diamagnetic material to remove the magnetic flux R which passes the metal plate of the housing 335. Thus, most of the magnetic flux P becomes a component Q that flows along the metal plate of the housing 335.

As a result, most of the magnetic fluxes generated by the coil 336 form a magnetic path which passes the inside of the housing 335, i.e., the conductive magnetic cylinder, extends from one aperture 334a to the outside of the housing 335 and which returns from the other aperture 334b to the inside of the housing 335. Thus, the magnetic flux is closed and therefore a harmful leakage flux can almost be suppressed.

Since the slit 337 is formed through the housing 335, currents i1, i2, i3 crossing the magnetic path shown in FIG. 26 are prevented from being induced in the housing 335 as shown in FIG. 26. Therefore, it is possible to suppress the occurrence of magnetic flux generated by the currents i1, i2, i3 which is in the opposite directions to the original magnetic flux flowing through the magnetic path.

On the other hand, in the case of the antenna (comparative example) in which a U-letter shaped magnetic circuit is formed by winding a coil 342 around a magnetic member of U-letter configuration (e.g., ferrite core) 341 shown in FIG. 28, a magnetic efficiency is high and a sensitivity is high. Moreover, there can be obtained a useful magnetic flux 343 flowing through the U-letter shaped magnetic path to the respective ends. On the other hand, there is generated a leakage magnetic flux 344 which flows from one end of the magnetic member of U-letter configuration to the rear surface thereof. Due to the leakage magnetic flux 344, if nearby-conductor and noise source are provided around the magnetic circuit of U-letter configuration, then they are easily affected by the leakage magnetic flux 344. There is then the risk that a read error will occur.

However, in the short-distance communication antenna 331 according to the seventh embodiment shown in FIG. 25, the housing 335 formed of the metal plate capable of magnetic shielding can avoid the occurrence of the harmful leakage magnetic flux 339 which flows to the rear surface of the housing 335 from the aperture 334b.

As described above, according to the inventive short-distance communication antenna 331, the main magnetic flux 340 accompanied with the information signal generated from the coil 336 is generated only in the direction between the two apertures 334a and 334b. Moreover, since this magnetic field intensity has a directivity, the communication area can be secured sufficiently within the regulation range of the radio law and the leakage magnetic flux flowed to the outside of the communication area can be suppressed, thus to obtain a high performance antenna which can be substantially prevented from interfering with the conductor (e.g., metal material) disposed near the antenna.

In particular, when the antenna communicates with a place somewhat distant therefrom, even if a magnetic resistance of the inside of the housing 335 increases a little, a performance of the antenna can be prevented from being lowered considerably because the original magnetic resistance of the outside is large.

Further, when the housing 335 is made hollow, the antenna becomes very light and inexpensive.

On the other hand, according to this embodiment, as shown in FIG. 29, the short-distance communication antenna 331 is disposed in use such that the magnetic flux direction of the antenna between the apertures 334a and 334b is extended along the moving direction a of the non-contacting information card 2 shown in FIG. 1.

If the short-distance communication antenna 331 is disposed along the moving direction a of the non-contacting information card 2, then the communication area can be extended.

FIG. 30 shows a short-distance communication antenna 347 according to an eighth embodiment of the present invention.

The short-distance communication antenna 347 differs from the short-distance communication antenna 331 shown in FIG. 25 only in that a part or whole of the magnetic circuit disposed within the housing 335 of U-letter configuration having the two apertures 334a and 334b is replaced with a magnetic member, e.g., ferrite core 348. In the illustrated example, the rectangular parallelpiped ferrite core 348 around which the coil 336 is wound is inserted into one vertical portion 333b of the housing 335.

According to the short-distance communication antenna 347 of the eighth embodiment of the present invention, since the ferrite core 348 is inserted into the magnetic circuit composed of the housing 335 of U-letter configuration, as compared with the short-distance communication antenna 331 shown in FIG. 25, the magnetic resistance of the magnetic circuit can be reduced more, the magnetic flux can pass the housing 335 more easily and the harmful leakage magnetic flux can be reduced more. Thus, a radiation efficiency of the main magnetic flux can be improved.

Since the ferrite core 348 is magnetically shielded by the metal housing 335, it is possible: to suppress the undesired harmful leakage magnetic flux generated from the ferrite core 348. Since the ferrite core 348 is inserted into the housing 335, it is possible to obtain a high performance antenna of high efficiency which can be prevented from interfering with the nearby conductor though the antenna becomes a little heavy.

If the amount of the inserted ferrite core 348 is selected in accordance with performance, weight and cost in actual practice, then it is possible to obtain the proper short-distance communication antenna of high quality which has less harmful leakage magnetic flux.

FIGS. 31 and 32 show a short-distance communication antenna according to a ninth embodiment of the present invention. As shown in FIG. 31, an inventive short-distance communication antenna 351 includes a metal housing formed of an E-letter shape cylinder having three apertures 352a, 352b, 352c, i.e., a housing 353 having a horizontal portion 355 and vertical portions 356a, 356b, 356c vertically extended from respective ends and the center of the horizontal portion 355 and in which end faces of the vertical portions 356a, 356b and 356c are formed as the apertures 352a, 352b, 352c and a coil bobbin 354 around which a coil 336 is wound inserted into the housing 353, i.e., the vertical portion 356b having the central aperture 352b in this embodiment.

The housing 353 of E-letter configuration is formed of a metal plate similar in form to the aforementioned housing 335 of E-letter configuration. The housing 353 of E-letter configuration also includes slits (grooves) 357 formed through the vertical portions 356a, 356b, 356c and the horizontal portion 355 to join the apertures 352a and 352b and the apertures 352b and 352c in order to avoid the short-circuit crossing of the magnetic path as similarly described above.

According to the short-distance communication antenna 351 of the ninth embodiment of the present invention, the magnetic fluxes 350a and 350b that are generated by the coil 336 form the magnetic path which extends from the central aperture 352b of the housing 353 to the outside of the housing 353 and which also returns from the apertures 352a and 352b of the respective ends of the housing 353 to the inside of the housing 353 to thereby close the magnetic fluxes 350a and 350b. Thus, the harmful leakage magnetic flux call be suppressed similarly to the embodiment shown in FIG. 25. Specifically, the main magnetic fluxes 350a, 350b generated from the coil 336 are generated only in the directions between the central aperture 352b and other apertures 352a, 352c of the respective ends of the housing 353. Since this magnetic field intensity has a directivity, the leakage of the magnetic flux to the outside of the communication area is small. Therefore, the communication area can be secured sufficiently within the regulation range of the radio law, i.e., the communication area can be extended sufficiently. Moreover, since the harmful leakage magnetic flux can almost be suppressed, it is possible to obtain a high performance antenna which can be prevented from interfering with nearby conductors substantially.

FIG. 33 shows a short-distance communication antenna according to a tenth embodiment of the present invention.

A short-distance communication antenna 357 according to the tenth embodiment differs from the short-distance communication antenna 351 shown in FIG. 31 only in that the coil 336 wound around the coil bobbin 354 is replaced with such one that results from winding the coil 336 around a magnetic member, i.e., ferrite core 348, and that this one is inserted into the central vertical portion 356b from the central aperture 352b.

According to this inventive short-distance communication antenna 357, since the ferrite core 348 is inserted into the magnetic circuit composed of the housing 353 of E-letter configuration, as compared with the embodiment shown in FIG. 31, the magnetic flux can pass the magnetic circuit more easily, the magnetic resistance can be lowered, the harmful leakage magnetic flux can be reduced more and the radiation efficiency of the main magnetic flux can be improved.

As the magnetic member inserted into the housing 353, e.g., the ferrite core 348, there can be used magnetic members of various shapes. Specifically, if the amount of the inserted ferrite core 348 is selected in accordance with performance, weight and cost in actual practice, then it is possible to obtain the proper antenna of excellent quality which does not generate a harmful leakage magnetic flux substantially.

Examples of the ferrite core 348 will be described with reference to FIGS. 34A through 34D and FIGS. 35E to 35G.

Figure 34A:
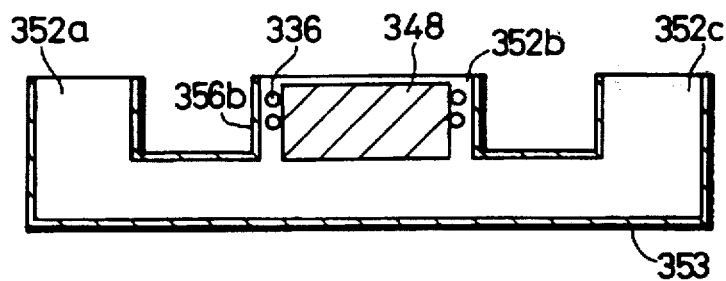

FIG. 34A shows an example wherein the ferrite core 348 with the coil 336 wound therearound is disposed only within the central vertical portion 356b of the housing 353 of E-letter configuration.

Figure 34B:
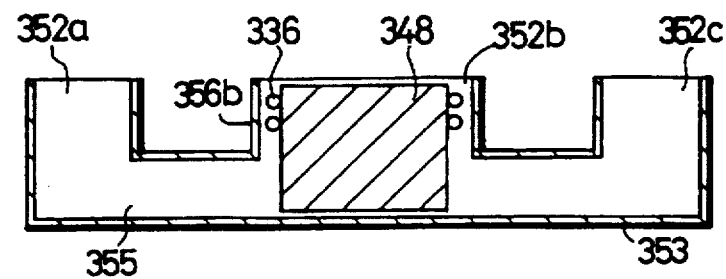

FIG. 34B shows an example wherein the ferrite core 348 with the coil 336 wound therearound is disposed in the portion from the bottom surface of the horizontal portion 355 to the upper surface of the central vertical portion 356b.

Figure 34C:
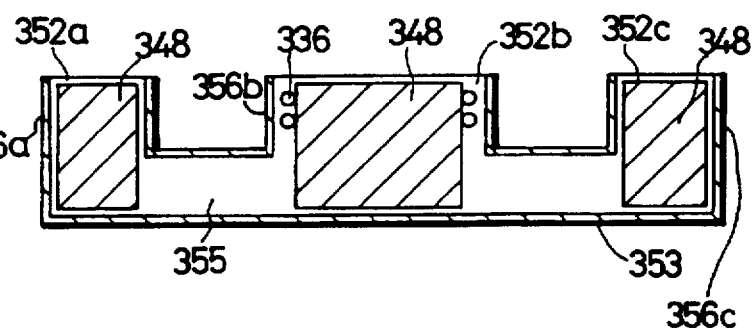

FIG. 34C shows an example wherein the ferrite core 348 with the coil 336 wound therearound is disposed in the portion from the bottom surface of the horizontal portion 355 to the upper surface of the central vertical portion 356b and ferrite cores 348 having no coils 336 wound therearound are disposed on the portion from the bottom surface of the horizontal portion 355 to the upper surface of the vertical portions 356a, 356c of the respective ends of the housing 353 of E-letter configuration, respectively.

Figure 34D:
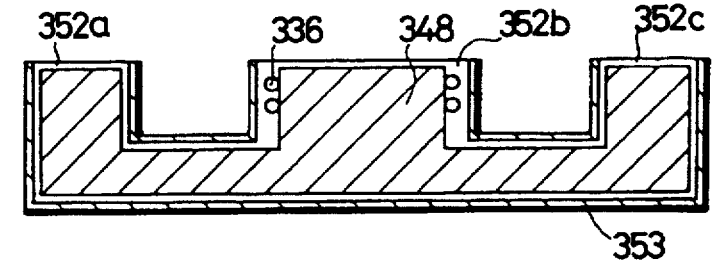

FIG. 34D shows an example wherein the ferrite core 348 of E-letter configuration is disposed so as to be completely filled into the housing 353 of E-letter configuration. Incidentally, the coil 336 is wound around the central protruded portion of the ferrite core 348.

Figure 35E:
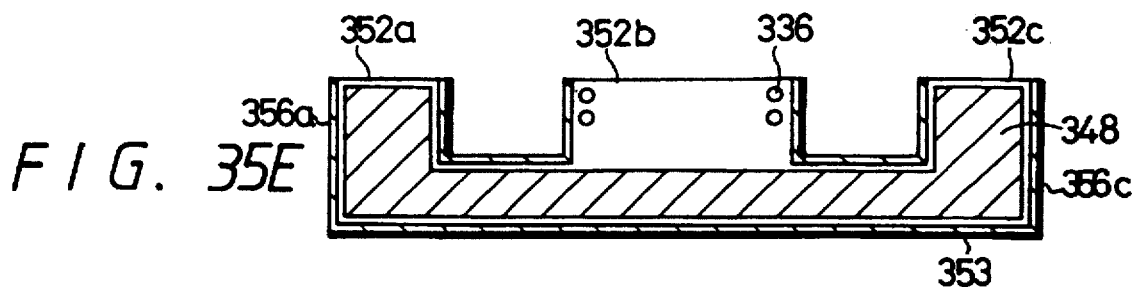

FIG. 35E shows an example wherein the ferrite core 348 of U-letter configuration that is joined with the vertical portions 356a, 356c of the respective ends of the housing 353 and the horizontal portion 335 is disposed within the housing 353.

Figure 35F:
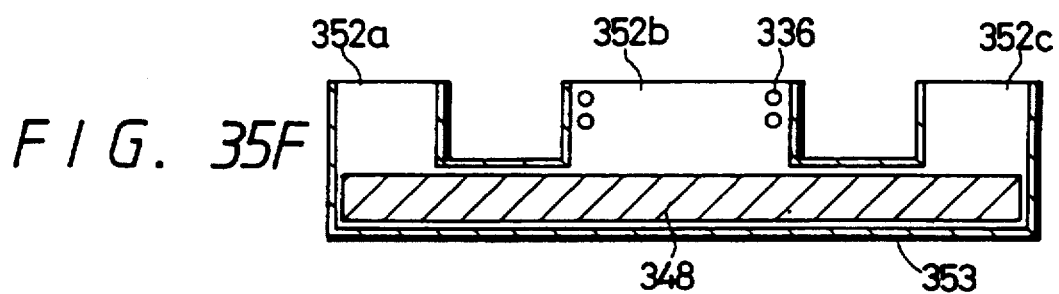

FIG. 35F shows an example wherein the ferrite core 348 is disposed only on the horizontal portion 355 within the housing 353.

In the embodiment shown in FIGS. 35E and 35F, a coil 336 is wound on the inner surface of the central vertical portion 356b.

Figure 35G:
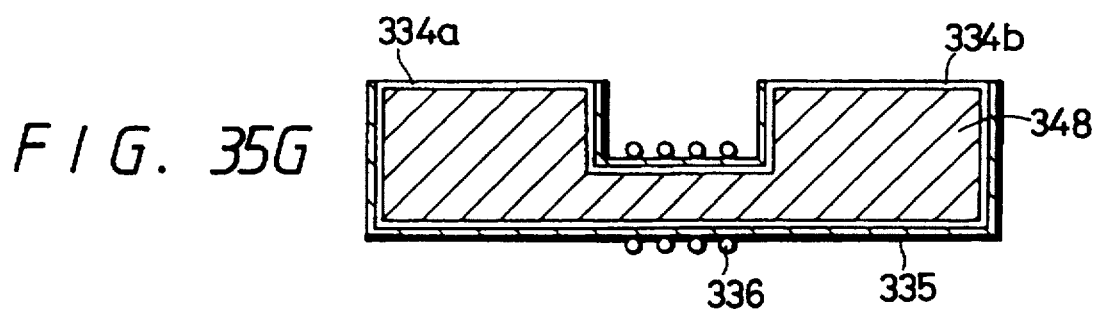

As the ferrite core 348 inserted into the U-letter shaped housing 335, there can be used ferrites of various shapes. For example, FIG. 35G shows an example wherein the ferrite core 348 of U-letter configuration is disposed within the housing 335 shown in the example of FIG. 25. As shown in FIG. 35G, the coil 336 also is not wound on the inner surface of the housing 335 but can be wound around the outside of the housing 335.

FIGS. 36 and 37 show a short-distance communication antenna 359 according to an eleventh embodiment of the present invention.

As shown in FIGS. 36 and 37, the inventive short-distance communication antenna 359 includes a housing 360 of E-letter configuration in which side surfaces of spacings 361 formed between the central vertical portion 356b and left and right end vertical portions 356a and 356c are closed. The coil 336 is mounted in the housing 360. In this embodiment, the E-letter shaped ferrite core 348 with the coil 336 wound around its central protruded portion is inserted into the inside spacing of the E-letter configuration of the housing 360.

In the short-distance communication antenna 359 according to this embodiment, since its housing 360 has a continuous rectangular parallelpiped structure as seen from the outside, it is possible to suppress the leakage magnetic flux much more as compared with the case that the short-distance communication antenna includes the housing 353 of E-letter configuration. The short-distance communication antenna 359 according to this embodiment can achieve similar action and effects to those of the short-distance communication antennas shown in FIGS. 31 and 33.

FIG. 38 and 39 show a short-distance communication antenna 362 according to a twelfth embodiment of the present invention.

As shown in FIGS. 38 and 39, the short-distance communication antenna 362 according to this embodiment comprises a metal housing 364 of a rectangular parallelpiped structure having an aperture 363 defined on the upper surface of the housing 364 and an E-letter shaped magnetic member, i.e., ferrite core 348 having a coil 336 wound around its central protruded portion inserted into the housing 364. The housing 364 is formed of a metal plate similar to the metal plate which forms the aforementioned housing 335.

In the short-distance communication antenna 362 according to this embodiment, as shown in FIG. 39, magnetic fluxes 365a, 365b generated by the coil 336 form a magnetic paths which extend from the center of the opening portion 336 to the outside of the housing 364 and which return from the respective ends of the opening portion 363 to the inside of the housing 364. Thus, the magnetic fluxes 365a, 365b are closed. Also in this case, a harmful leakage magnetic flux 366 can be shielded by the housing 364 and is not generated. Accordingly, it is possible to obtain an antenna wherein the leakage magnetic flux to the outside of the communication area is small and the interference to the conductors provided near the antenna is small while the communication area can be secured sufficiently such as described above.

The short-distance communication antenna according to this embodiment can be applied to the case where a disturbance of an internal magnetic path is small and where a remarkable bad influence is not exerted upon the characteristics.

Since the housings of the respective embodiments are formed of a thin copper plate, for example, though not shown, in order to improve a mechanical strength thereof it is possible to form the housing as a double-structure by covering the outside of the housing with a mechanically strong iron material.

In the respective short-distance communication antennas according to the embodiments shown in FIGS. 30, 31, 33, 34, 35, 36 and 38, when the antenna is in use, the magnetic flux direction of the antenna is extended along the moving direction a of the non-contacting information card 2 similarly to FIG. 29. Thus, the communication area can be extended.

On the other hand, as the coil 336, a flat type wire 462, hereinafter alternatively referred to as a flat type wire coil shown in FIG. 40 is preferable rather than a round type wire 461 hereinafter alternatively referred to as a round type wire coil 461, shown in FIG. 41. The reason for this is as follows. That is, since a length of a magnetic path of a local magnetic flux 370 generated in a conductor of one turn of the flat type wire coil 462 is long as compared with that of the round type wire coil 461, a magnetic resistance increases and the local magnetic flux 370 decreases. Moreover, in the case of the flat type wire coil 462, the local magnetic fluxes 370 cancel each other out between adjacent conductors and become small. On the other hand, in the case of the round type wire coil 461, the local magnetic fluxes 370 cancel each other out only on the central portion of the adjacent conductors, where it is more difficult to cancel each other out on the peripheral portion of the conductors. As a consequence, if the flat type wire coil 462 is used, it is possible to reduce the harmful leakage magnetic flux much more. In FIGS. 40 and 41, reference numeral 371 depicts a main magnetic flux.

According to the inventive short-distance communication antenna, since the magnetic flux accompanied with the information signal is closed, the communication area can be maintained sufficiently and the leakage magnetic flux leaked to the outside of the communication area can be reduced by the metal housing. Therefore, satisfactory transmission and reception can be carried out within the regulation range of the radio law. Moreover, the leakage magnetic flux is small and therefore the interference on the conductors disposed near the antenna is small.

Further, since the magnetic field intensity has a directivity, the magnetic flux density is improved and also the transmission and reception efficiency can be improved.

When the slit is formed through the housing, an induction of a current crossing a magnetic path is blocked and the occurrence of reverse magnetic flux based on an induced current is blocked, thereby making it possible to suppress a more harmful leakage magnetic flux.

When the magnetic member is disposed within the housing, a magnetic resistance of a magnetic circuit formed within the housing can be reduced and an efficiency with which the antenna radiates a magnetic flux can be improved.

Since the coil, which is formed by winding a conductor around a magnetic member, is inserted into the housing, a magnetic flux generated from the coil passes the magnetic member. Therefore, the leakage magnetic flux can be suppressed much more and the magnetic resistance becomes small. Thus, it is possible to improve an efficiency with which the antenna radiates a magnetic flux.

Further, when the flat type wire 462 is used as the conductor forming the coil, a local leakage magnetic flux generated in each conductor can be suppressed. Therefore, it is possible to obtain the short-distance communication antenna which has less leakage magnetic flux.

Furthermore, according to the method of using a short-distance communication antenna of the present invention, it is possible to extend the communication area by disposing the short-distance communication antenna such that the magnetic flux direction of the antenna is extended along the moving direction of the non-contacting information card.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication antenna provided on a card reader/writer to transmit and receive an information signal from said card reader/writer to and from a non-contacting information card by electromagnetic induction, comprising:

a substrate insulating material;

a first antenna conductor;

a second antenna conductor; and a plurality of adjustment strips, wherein said first and second antenna conductors and said plurality of adjustment strips are respectively formed on an upper surface and a lower surface of said substrate insulating material to form a plurality of conductor patterns in the form of a plurality of loops, said plurality of conductor patterns formed on said upper surface and said lower surface of said substrate insulating material being connected through a through-hole such that currents in adjacent loops flow in opposite directions.

* * * * *

UNITED STATES PATENT AND TRADEMARK OFFICE
CERTIFICATE OF CORRECTION

PATENT NO. : 5,694,139
DATED : December 02, 1997
INVENTOR(S) : Shoshichi Saito, Masahiro Fujimoto, Katsuhisa Orihara and Susumu Yanagibori It is certified that error appears in the above-indentified patent and that said Letters Patent is hereby corrected as shown below:

On the Title page, item [75]:
The first inventor's last name should be changed from "Saito" to --Saitoh--
The Assignee should be changed from "Sony Corporation. Tokyo, Japan" to --Sony Chemicals Corporation. Tochigi, Japan--
In the References Cited, the date of Patent No. 5,583,330 should be changed from "12/1996" to --1/1995--

Col.1, line 66, change "PIG.2" to --Fig.2--
Col.4, line 23, delete "," after transmit first and second occurrence
    same line, delete "," after "or"
    line 39, delete ";" after "transmitting" and after "receiving"
    line 44, delete "," after tranmit first and second occurrence
    same line delete "," after "receive"
    line 45, delete "," after "to" first occurrence
    line 54, delete ";" after "to" first occurrence
Col. 5, line 3, delete "," after transmit first occurrence.
    same line delete "," after --receive--
Col.6, line 26, change "other" to --another--
Col.8, line 59, change "an second" to --a second--
Col.11, line 60, change "PIGS. 19A to 19C" to --FIGS. 19A to 19C--

Signed and Sealed this

Seventh Day of July, 1998

*Attest:*

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,694,139
DATED : December 2, 1997
INVENTOR(S) : Shoshichi Saito, Masahiro Fujimoto, Katsuhisa Orihara and Susumu Yanagibori It is certified that error appears in the above-identified patent and that said Letters Patent is hereby corrected as shown below:

On title page, item [73]
The Assignee should be changed from "Sony Corporation. Tokyo, Japan" to
--Sony Chemicals Corporation. Tochigi, Japan--

Signed and Sealed this

Third Day of November, 1998

Attest:

BRUCE LEHMAN

Attesting Officer      Commissioner of Patents and Trademarks